United States Patent [19]

Romanski

[11] 4,409,661

[45] Oct. 11, 1983

[54] AIMPOINT SELECTION PROCESSOR

[75] Inventor: John G. Romanski, Kingsville, Md.

[73] Assignee: The United States of America as represented by the Secretary of the Air Force, Washington, D.C.

[21] Appl. No.: 256,362

[22] Filed: Apr. 22, 1981

Related U.S. Application Data

[63] Continuation-in-part of Ser. No. 68,817, Aug. 22, 1979, abandoned.

[51] Int. Cl.$^3$ .................. G06F 15/58; H04N 3/00; H04N 7/18
[52] U.S. Cl. ..................... 364/516; 235/411; 358/125
[58] Field of Search .............. 364/516, 521; 235/411, 235/412, 413; 343/5 DP; 358/125

[56] References Cited

U.S. PATENT DOCUMENTS

| | | | |
|---|---|---|---|
| 3,646,554 | 2/1972 | Fierston et al. | 343/5 DP |
| 3,885,224 | 5/1975 | Klahr | 343/5 DP X |
| 4,004,083 | 1/1977 | Norem | 358/125 |
| 4,099,719 | 7/1978 | Dean et al. | 235/411 |
| 4,133,004 | 1/1979 | Fitts | 358/125 |
| 4,162,775 | 7/1979 | Voles | 235/411 |
| 4,179,696 | 12/1979 | Quesinberry et al. | 235/412 |
| 4,316,218 | 2/1982 | Gay | 358/125 |
| 4,364,089 | 12/1982 | Woolfson | 358/125 |

OTHER PUBLICATIONS

Giles: A Digital Video Tracking System Proceedings Society of Photo Optical Instrum. Eng. (SPIE), vol. 230—1980, pp. 191-198.

*Primary Examiner*—Felix D. Gruber
*Attorney, Agent, or Firm*—Donald J. Singer; Willard R. Matthews

[57] ABSTRACT

The selection and designation of an aimpoint on a known type of target appearing in the field of view of a video tracking system imaging sensor is accomplished by (a) developing binary target patterns from quantized sensor data generated in the video tracking system video preprocessor; (b) measuring the moments of the target patterns; (c) developing and storing a target reference pattern data base; (d) computing from real time binary coding and moment measurement data and from the stored target reference pattern data base an ensemble of estimated aimpoints; (e) testing the validity of the estimated aimpoints; and (f) averaging valid estimated aimpoints to provide an output aimpoint signal. Mechanization of the invention comprehends the use of video tracking system functions to provide quantized binary coded target patterns and the use of dedicated accumulators to generate pattern moment measurements. A microprocessor computes and stores the target pattern reference data base and performs the aimpoint selection algorithm.

4 Claims, 24 Drawing Figures

4,409,661

AIMPOINT SELECTION PROCESSOR

STATEMENT OF GOVERNMENT INTEREST

The invention described herein may be manufactured and used by or for the Government for governmental purposes without the payment of any royalty thereon.

CROSS REFERENCE TO RELATED APPLICATION

This application is a continuation-in-part of U.S. patent application Ser. No. 68,817 filed 22 Aug. 1979 and now abandoned.

BACKGROUND OF THE INVENTION

This invention, in general, relates to video tracking systems and to the image processing functions of such systems. Particularly, it comprehends an aimpoint selection processor for improving and expanding the usefulness of such systems.

Video tracking systems include an imaging sensor, such as a television camera, and target tracking circuits that stabilize the target in the sensor's field of view. Certain countermeasures applications require that the image be located precisely relative to system coordinates. Furthermore, the direction of defensive missiles and the like call for the exact location of an aimpoint on the target itself. Because of various visual and detection abberations the perceived image location may not necessarily coincide with the target location. State-of-the-art systems are generally incapable of detecting and correcting for such deviations. The present invention is directed toward solving this problem and doing so by utilizing data and processing circuits already present in the video tracking system. Such an approach frees computer functions for complicated non-repetitive operations and allows algorithm execution at video field rates.

SUMMARY OF THE INVENTION

The invention comprehends a method and mechanization for locating a region on an object which appears in the field of view of an imaging sensor such as a television camera. The device works in conjunction with a video tracking system which stabilizes the object in the sensor field of view. The sensor image is quantized in space (pixels) and in amplitude (gray levels) by most typical video tracking systems which require data in this format. The same information is made available to a system video preprocessor. This device isolates the target object in two nested windows of pixels and provides information as to which gray levels are characteristic of the target and which serve to define the background.

The gray level information is used by the aimpoint processor of the invention to generate binary images on which the aimpoint selection process is based. That is, the pixels which are indicative of a target have their gray level values replaced with a binary value of 1, whereas the gray levels of the other pixels are replaced with a binary 0. The moments of this binary pattern are then measured. These measurements and some further computations serve to characterize the binary pattern. The binary pattern is further processed to extract reference points on the target pattern. Computations are performed using the pattern measurements and stored data to designate an ensemble of possible aimpoints in terms of offset distances from the reference points. The stored data are obtained by measuring offsets from the reference points to the desired aimpoint using a reference pattern. This reference pattern is obtained by generating a silhouette of the desired target at some point in its trajectory. The reference data are then generated by the same procedure as that which is used to designate the aimpoints with the exception that a prior knowledge of the aimpoint on this pattern is used to determine the correct reference offsets.

Once this ensemble of possible aimpoints has been collected, each can be subjected to several validation tests. For example, a simple test is to check to determine if the candidate aimpoint lies within the binary pattern. Also, clustering properties of the ensemble can also be examined. Individual ensemble members are accepted or rejected dependent upon these tests. The remaining ensemble aimpoints are then averaged, (this may or may not be an arithmetic average) to determine a composite aimpoint. This composite aimpoint, given in terms of image coordinates, is made available for other devices.

It is a principal object of the invention to provide a new and improved aimpoint processor.

It is another object of the invention to provide accurate automatic means for selecting and designating an aimpoint on a known type of target appearing in the field of view of a video tracking system.

It is another object of the invention to provide an aimpoint processor for use in a video tracking system that utilizes data and processing circuits existing in the tracking system and that permits microprocessor execution of the aimpoint computation algorithm at video field rates.

These together with other objects, features and advantages of the invention will become more readily apparent from the following detailed description when taken in conjunction with the illustration embodiment in the accompanying drawings.

DETAILED DESCRIPTION OF THE PREFERRED EMBODIMENT

Figure 1:
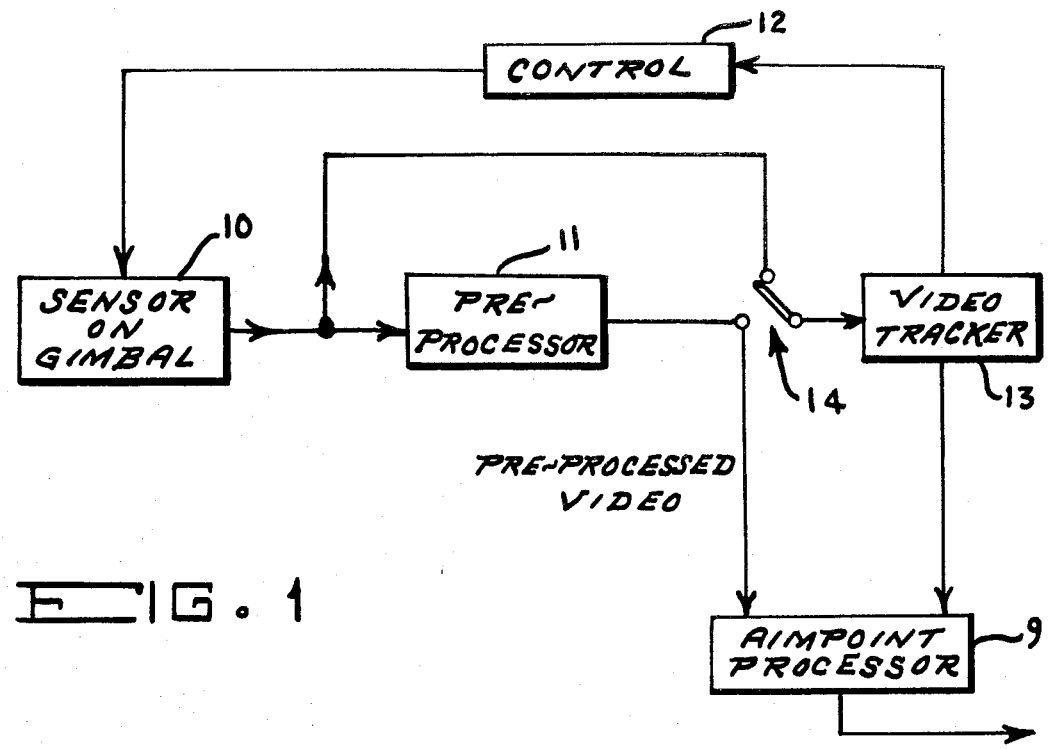
FIG. 1 is a block diagram of the invention in a system environment.

The aimpoint processor described herein is designed to operate against a known target in a well defined scenario. The technique requires an imaging sensor and a video tracking system to stabilize the desired target somewhere in the sensor field of view. The tracking system also provides some service functions which are required by the aimpoint processor. These involve the spatial and amplitude quantization of the sensor image into pixels and gray levels, respectively. Also generated by the video tracker are windows which define the general area of the sensor field of view in which the target is located and over which the tracking and aimpoint designation functions are performed. FIG. 1 is a general block diagram of the system environment and comprises video tracker 13, control circuit 12, preprocessor 11, sensor 10, switch 14 and aimpoint processor 9. In FIG. 1 aimpoint processor 9 represents the aimpoint selection processor of the invention and the remaining blocks represent a state of the art video tracking system in which the invention can be utilized.

Figure 2:
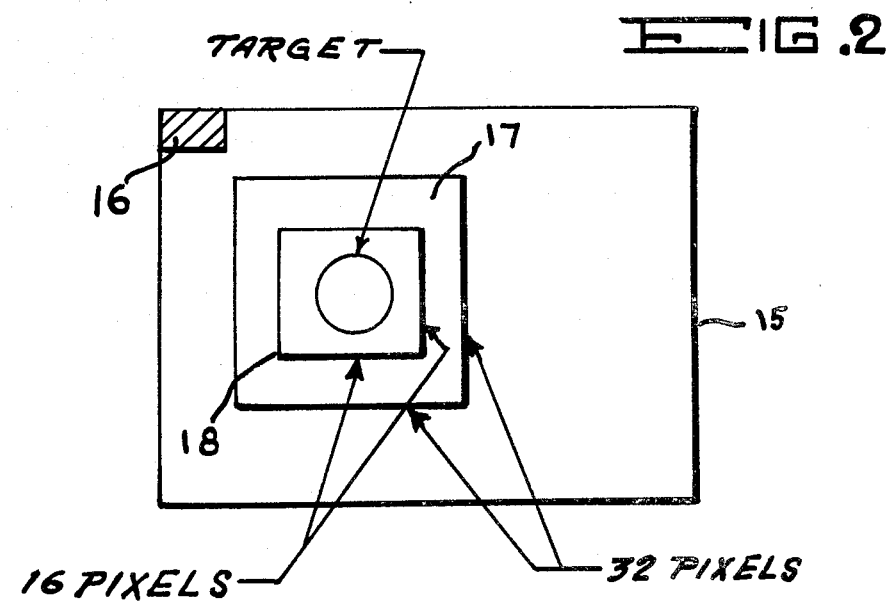
FIG. 2 illustrates the relationship of target and tracking windows in the sensor field of view.

Relationships of target and tracking windows in the sensor field of view are illustrated by FIG. 2. The tracking and aimpoint selection functions are performed within the outer window 17. The inner window 18 is used internally by the tracker 13 and preprocessor 11. The scene is quantized spatially into pixels 16. The amplitude of each pixel 16 is quantized into gray levels $P_{ij}$, where i, j indicate the row-column coordinates of the pixel in the outer windows. Typical window dimensions are shown for purposes of illustration. Window size can be changed to accomodate varying target size.

The video tracker 13, for example, the Westinghouse Digital Correlation tracker is capable of locating a target to within $\frac{1}{8}$ pixel anywhere inside the outer window 15 depicted in FIG. 2. The preprocessor 11, may or may not be used to preprocess the tracker video. It is required to preprocess the aimpoint video. Also, internal functions of the preprocessor 11 are made available to the aimpoint processor 9 in order to generate the binary pattern which is the starting point of the aimpoint selection process.

The preprocessor 11 provides basic information from which the binary pattern is derived. A cursory description of the operation of the preprocessor is provided here in order to simplify understanding of the formation of the binary pattern. The preprocessor forms the gray level histograms for the inner and outer windows 17, 18 denoted as HI(k) and HO(k). K is an index signifying gray level. $K_\epsilon [o, g_{max}]$, where $g_{max}$ is the maximum gray level value allowed by the intensity quantization hardware. HI(k) and HO(k) are initially 0 for all K. The histograms are then formed by scanning the outer and inner windows and counting the number of pixels $P_{ij}$ with each gray level:

$$\text{If } Q_{ij}^k = \begin{cases} 1; \text{ if } P_{ij} = K \\ 0; \text{ otherwise} \end{cases} \quad (1)$$

$$\text{Then } HI(k) = \sum_{(i,j)\epsilon I} Q^k_{ij} \quad (1)$$

$$HO(k) = \sum_{(i,j)\epsilon O} Q^k_{ij} \quad (2)$$

for all gray levels.

Next a contrast function is formed by taking the positive difference function of the gray level histograms. If $$m = HI(k) - HO(k) \quad (3)$$

$$\text{then } C(k) = \begin{cases} m; m > 0 \\ 0; \text{ otherwise} \end{cases} \quad (4)$$

From this function a discriminant function is derived $$D(k) = \begin{cases} 1; C(k) > 0 \\ 0; \text{ otherwise} \end{cases} \quad (5)$$

Now, all gray levels, k, for which D(k)=1 are tested for residual background content. That is, the outer window histogram value for that gray level, HO(k), is compared to a threshold, T. If HO(k)>T, the D(k) is also set to 0. This is effective in limiting unwanted pattern extensions and isolating the target to the inner window. The preprocessor forms a new pattern $\hat{P}$ such that $$\hat{P}_{ij} = D(P_{ij}) \cdot P_{ij} \text{ for all } {ij\epsilon I \cup O} \quad (6)$$

This preprocessed video is also available to the tracker 13 which can be configured to use it in lieu of the original video. The discrimator function is made available to the aimpoint processor 9.

Once the discriminant function has been computed by the preprocessor 11, it is used by the aimpoint processor 9 to form the binary pattern. This is accomplished by replacing pixels with the corresponding value of the discriminant function for all pixels within the active area, using table search methods $$\hat{P}_{ij} = D(P_{ij}) \quad (7)$$

Figure 3:
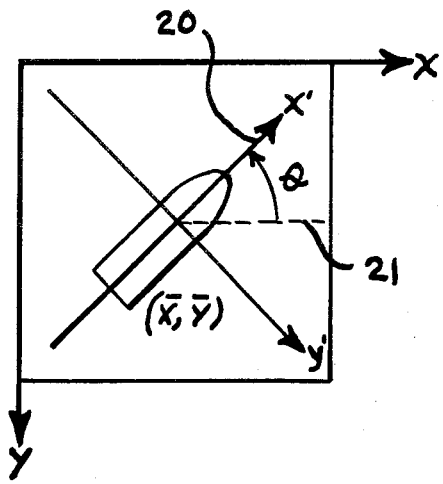
FIG. 3 illustrates the orientation of axes and target pattern.

The binary pattern, as described above, forms the basic input to the aimpoint processor. The first step is to perform some simple measurements on the pattern. These are the first moments, second central moments, and joint first moments:

$$\bar{x} = \frac{1}{u} \sum_{j=1}^{n} \sum_{i=1}^{n} j \hat{P}_{ij} \quad (8)$$

$$\bar{y} = \frac{1}{u} \sum_{j=1}^{n} \sum_{i=1}^{n} i \hat{P}_{ij} \quad (9)$$

$$\sigma_x^2 = \frac{1}{u} \sum_{i=1}^{n} \sum_{j=1}^{n} j^2 \hat{P}_{ij} - \bar{x}^2 \quad (10)$$

$$\sigma_y^2 = \frac{1}{u} \sum_{i=1}^{n} \sum_{j=1}^{n} i^2 \hat{P}_{ij} - \bar{y}^2 \quad (11)$$

$$\sigma_{xy} = \frac{1}{u} \sum_{i=1}^{n} \sum_{j=1}^{n} ij \hat{P}_{ij} - \bar{x}\bar{y} \quad (12)$$

$$u = \sum_{i=1}^{n} \sum_{j=1}^{n} \hat{P}_{ij} \quad (13)$$

and n is the pixel dimension of the active area. Equations 8 and 9 define the coordinates of the pattern centroid ($\bar{x}, \bar{y}$). This will be the origin of the principal pattern coordinate axes. Equations 10 and 11 define the pattern variances along the x and y axes (sensor coordinates). The pattern covariance is given by Equation 12. Using the variance and covariance measurements, the angle that the principal axes of the pattern subtends with the axes of the sensor (illustrated as between axes 20, 21 in FIG. 3) is given by:

$$\theta = \frac{1}{2} \tan^{-1} \frac{2\sigma_{xy}}{\sigma_y^2 - \sigma_x^2} \quad (14)$$

With this information, it is possible to compute the variances along the pattern axes x'-y' coordinate system):

$$\sigma_{x'}^2 = \sigma_x^2 \cos^2\theta - \sigma_{xy} \sin 2\theta + \sigma_y^2 \sin^2\theta \quad (15)$$

$$\sigma_{y'}^2 = \sigma_x^2 \sin^2\theta + \sigma_{xy} \sin 2\theta + \sigma_x^2 \cos^2\theta \quad (16)$$

The computations of equations (15) and (16) are based on the rotational transformation of the i, j coordinates (x-y system) into i', j' coordinates (x'-y' system) in equations (8) thru (11) using standard techniques. Also used is the fact that $\sigma_{x'y'} = 0$, by definition, in the x'-y' system.

Once these variances have been computed, a crude size estimate of the pattern is possible. If the pattern is assumed to be a perfect rectangle, its length and width are given by:

$$SZX = \sqrt{12\sigma_{x'}^2} \quad (17)$$

$$SZY = \sqrt{12\sigma_{y'}^2} \quad (18)$$

The maximum dimension will always be defined to lie parallel to the x' pattern axis. For most patterns of interest, the positive x' axis is also in the direction of motion of the pattern.

The next step in the processing scheme is to determine the pixels that lie along the principal pattern axes. This is done by computing mathematically the two perpendicular lines in terms of the original coordinates, and then rounding to the nearest pixel. Once the axial pixels have been determined, they are searched outward from the origin (centroid) to determine the pixels at which the binary pattern edge intersects the pattern principal axes. These four intersection pixels along with the centroid constitute a reference point. The centroid will be labeled R1. The other four reference points are labeled R2 thru R5 running counterclockwise from the intersection point on the positive x' axis. Aimpoints will be designated with respect to these reference points.

The aimpoint selection algorithm is designed to locate a predetermined region on a known object. In order to achieve this, information concerning the location of the aimpoint on the target must be available. Simple pattern measurements of the sensor image are then used to adjust the stored data in a manner such that the processor is able to locate the same regions over various aspects of the target image. The discussion below describes the construction of the data base and the selection of aimpoints on sensor images using these data.

Figure 4:
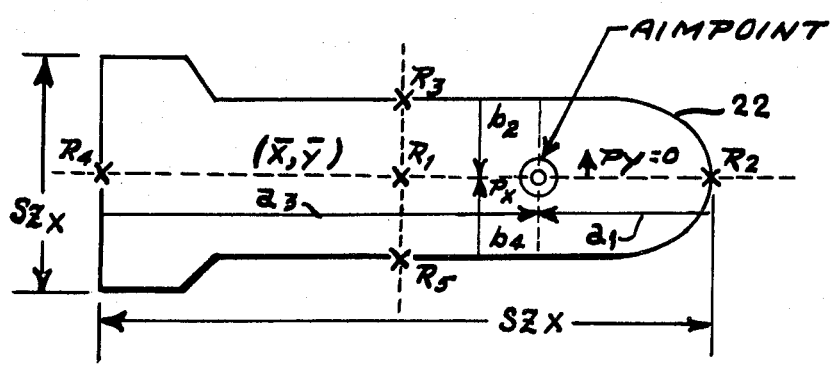
FIG. 4 illustrates definition on a binary training pattern showing various reference points.

The data base is constructed as follows: A silhouette or line drawing of the target, preferably a side-on view, is processed into a binary pattern. Pattern measurements are performed, axes drawn and reference points selected on the binary silhouette. The aimpoint is specified in terms of offsets from the centroid and axial reference points. These offsets along with the pattern size measurements for this reference are stored in a feature vector $\overline{F}$. The eight parameters of this vector are the data which is used for further processing. Derivation of the offsets is best explained by the illustration of FIG. 4 indicating aimpoints definition on a binary training pattern 22 and showing reference points R1, R2, R3, R4, R5, centroid ($\overline{x}$, $\overline{y}$), offsets $a_1$, $b_2$, $a_3$, $b_4$, $P_x$, $P_y$ and size estimates SZX and SZY. F denotes the feature vector $\overline{F} = (SZX, a_1, b_2, a_3, b_4, P_x, P_y)$. Once this data base has been established for a given target scenario, aimpoint processing can be accomplished using real time imagery. Proceeding in the manner described above, the digitized sensor video is processed into a binary pattern. Pattern measurements are made and the appropriate parameters computed. Axes are drawn and reference points determined and aligned such that R2 is in the direction of motion. The centroid is found and designated as R1. Size ratios are computed as the ratio of the measured size (designated SZX' or SZY') for the current pattern to the stored sizes in the feature vector $\overline{F}$:

$$RXY = SZX'/\overline{F}(1) \quad (19)$$

$$RSY = SZY'/\overline{F}(2) \quad (20)$$

This is in reality an estimate of the aspect change between the real and reference pattern. These ratios, which are given with respect to the pattern principal axes, will be used to adjust the aimpoint offsets directly for the aspect change.

The next step in the processing algorithm is to generate estimates of the aimpoint location. An ensemble of 5 aimpoint estimates are computed. These are given in terms of offsets along the x'-y' axes from the centroid and all possible pairs of axial reference points. The pairs are constrained to consist of 1 reference point on the x' axis and the other on the y' axis. Subject to this orthogonal constraints, there are only four possible pairs of reference points on which to base an aimpoint estimate. Table I enumerates these and the associated aimpoint predictions. The aimpoints are given in the coordinate system of the patterns axes (x'-y') with the centroid as the origin. From this ensemble of 5 aimpoint estimates, $\{(AR_{xi}, AP_{yi}), i=1.5\}$ a composite aimpoint will be determined. These are tabulated in Table 1.

TABLE I

| Reference | i | x' Coordinate $-AP_{x\,i}$ | y' Coordinate $-AP_{y\,i}$ |
|---|---|---|---|
| R1 (Centroid) | 1 | RSX · F(7) | RSY · F(8) |
| R2, R3 | 2 | R2 + RSX · F(3) | R3 + RSY · F(4) |
| R2, R5 | 3 | R2 + RSX · F(3) | R5 + RSY · F(6) |
| R4, R3 | 4 | R4 + F(5) · RSX | R3 + RSY · F(4) |
| R4, R5 | 5 | R4 + F(5) · RSY | R5 + RSY · F(6) |

A few comments concerning redundancy are in order here. If the pattern formation and measurement processes are perfect and noise free, then all five aimpoint estimates should be degenerate. These preconditions, however, are most unlikely to occur.

Figure 5:
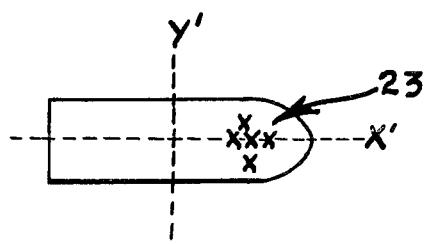
FIG. 5 illustrates a target and an ensemble of aimpoints.

Therefore, it is expected that, at the very least, two or more estimates will be different. The aimpoint ensemble may be thought of as defining an area on the target pattern. This is illustrated by aimpoints 23 in FIG. 5. A composite aimpoint can be computed as the arithmetic or a weighted mean over the ensemble. Before this is done, a few simple tests can be applied to the ensemble members. For example, the ensemble members should be tested for enclosure on the binary pattern:

$$(AP_{xi}, AP_{yi}) \hat{\epsilon} \hat{P}, \; i=1, n, \; n=5 \quad (21)$$

If the test in equation 21 is not met, that ensemble member should be rejected and the ensemble size reduced (n=n−1). Other tests based on clustering properties can be devised. For example, a composite aimpoint is given initially by the airthmetic mean:

$$(AP_{x'}, AP_{y'}) = \left(\frac{1}{5}\sum_{i=1}^{5} AP_{x'i}, \frac{1}{5}\sum_{i=1}^{5} AP_{y'i}\right) \quad (22)$$

Now the variances of the ensemble are:

$$\sigma AP_{x'}^2 = \frac{1}{5}\sum_{j=1}^{5}(AP_{xj}^1 - AP_{x'})^2 \quad (23)$$

$$\sigma AP_{y'}^2 = \sum_{i=1}^{5}(AP_{y'j} - AP_{y'})^2 \quad (24)$$

If any members of the ensemble lie outside of a specified distance of the arithmetic mean, eq. 22, (in terms of $\sigma AP_{x'}^2$, $\sigma AP_{y'}^2$), these members can be deleted from the ensemble and a new composite aimpoint computed using this reduced ensemble:

$$(AP_{x'}, AP_{x'}) = \frac{1}{n}\sum_{j=1}^{n}(AP_{x'i}, AP_{x'j}) \quad (25)$$

where n is the number of aimpoint estimates remaining in the ensemble. The composite aimpoint of equation 25 is provided as an output for whatever further processing is desired.

The variance measurements of equations 23 and 24 can be used to estimate the area over which the aimpoint ensemble extends. Using the same rectangular approximation described above, the length and width of the ensemble area is:

$$L_{va} = \sqrt{12\sigma_{AP_{x'}}^2} \quad (26)$$

$$W_{va} = \sqrt{12\sigma_{AP_{y'}}^2} \quad (27)$$

These parameters and/or their product can be compared to a threshold. This, in effect, would define a simple go-no go test for aimpoint validity as well as a simple efficacy measure for the entire processing algorithm. Several other validity tests can also be devised. These however, have to be tailored to the individual target scenario and are not applicable to this general discussion.

The aimpoint selection algorithm described has been tested using computer simulation techniques. The results of these simulations indicate that the algorithm is capable of selecting the proper aimpoint to within ½ pixel. A typical mechanization, capable of executing the algorithm in real time, is described below.

The proposed mechanization described herein is designed to operate in conjunction with a digital correlation tracker and a video preprocessor. These units provide data inputs for the aimpoint processor as well as performing some service functions, such as image digitization and window location within the sensor raster. The aimpoint processor itself is split into a dedicated hardware portion and a microprocessor section. The dedicated hardware forms the binary pattern and measures the first and second pattern moments. The microprocessor computes the sizes, rotation angle, centroid, etc., as well as selecting the reference points, forming the aimpoint ensemble, performing validity tests and computing a composite aimpoint. The microprocessor (which can be any suitable commercially available device is then programmed to implement the foregoing equations. The flow chart comprised of FIGS. 8-24 directs the programming of any particular microprocessor to generate the specific code required to implement the method of the invention. The following Table II is a symbol table for the flow chart of FIGS. 8-24.

TABLE II

| SYMBOL | FUNCTION |
| --- | --- |
| sin | Table of values for sine function |
| cos | Table of values for cosine function |
| cos² | Table of values for cosine squared function |
| sin² | Table for values of sine function |
| tan | Table for values of tangent function |
| tan⁻¹Z | Table of values for inverse tangent function |
| TS 1 | Starting location for tangent table |
| TS 2 | Starting location for sine table |
| TS 3 | Starting location for cos² table |
| TS 4 | Starting location for sin² table |
| TS 5 | Starting location for tan table |
| TS 6 | Starting location for Feature vector F |
| TS 7 | Starting location for cos table |
| F | Eight element target feature vector |
| A | Normalization constant |
| B | Raw first moment data (x dimension) |
| C | Raw first moment data (y dimension) |
| D | Raw second moment data (x dimension) |
| E | Raw second moment data (y dimension) |
| F | Raw joint moment data |

Figure 6:
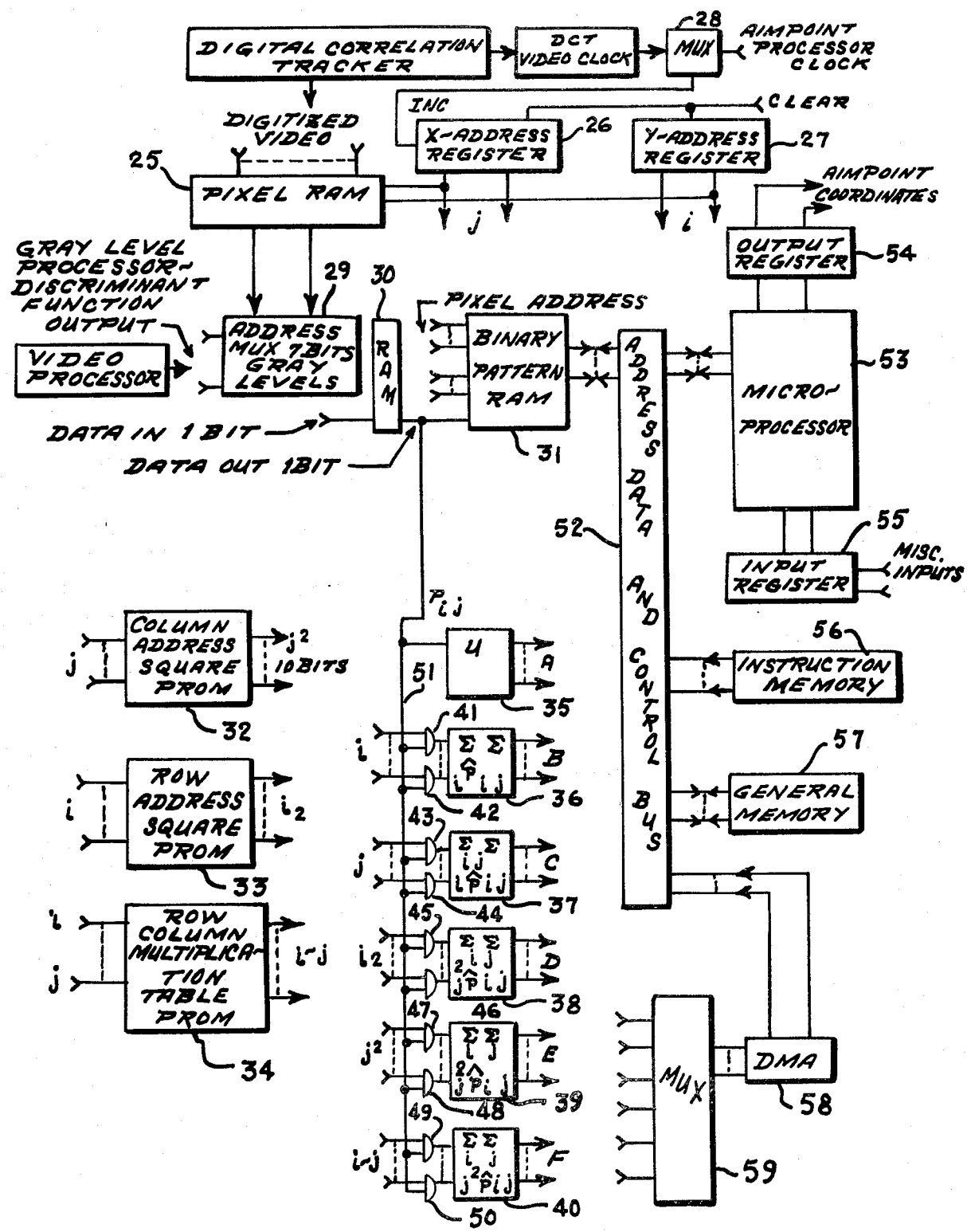
FIG. 6 is a block diagram of the aimpoint processor of the invention.

FIG. 6 is a block diagram of the aimpoint processor. It comprises microprocessor 53 including input register 55 and output register 54, image binary coding means including pixel ram 25, address multiplexer 29, discriminant function storage word X1 bit RAM 30 and, binary pattern RAM 31. These components are addressed and fed by x-address register 26, y-address register 27, multiplexer 28, digital correlation tracker and aimpoint processor clocks, and system functions from the video processor and the digital correlation tracker. Moment measurements are made by the circuit comprising PROMs 32-34, bus 51, AND gates 41-50, and accumulators 35-40. The output of ths circuit is fed to address, data and control bus 52 through multiplexer 59 and direct memory access interface 59. Instruction memory 56 and general memory 27 also must be connected to the address data and control bus 52. Digitized video provided by the digital correlation tracker is clocked into a holding memory PIXEL RAM 25 by a clock provided by the digital correlation tracker. A counting register X-Y address register 26, 27 initially zeros, counts the clock pulses and provides the PIXEL address. The PIXEL RAM 25 serves as a holding buffer for the large window in the sensor image, while the gray level processor forms and loads the discriminant function. The discriminant function is loaded into a 128 word ×1 bit (the number of words can be adjusted to the number of gray levels used) random access memory RAM 30 where the address is the gray level value and the single data bit indicates the corresponding discriminate function value.

After the discriminant function is loaded, the X-Y address registers are reset and a clock internal to the aimpoint processor is used to cycle these through each PIXEL address. For each address, the PIXEL value is provided, through the Address Multiplexer 28, as the address for the Discriminant Function Storage RAM 30. The resultant data bit is, in effect, the binary pattern value, $P_{ij}$, for the row-column address on lines i and j. These lines, i and j, also serve as address inputs for three separate sets of Programmable Read Only Memories (PROM) 32, 33, 34. The memories are programmed such that the data outputs are the square of the address inputs for two sets and the data outputs of the third set are programmed such that they are the product of the i and j address lines. Appendix A (not printed) incorporated herein and entitled Table III presents a typical program of binary data for generating the row and column address PROMS 32, 33. The following page 1 of Table III is an example of the program.

TABLE III
ROW-COLUMN MULTIPLICATION TABLE PROM

| ROW ADDRESS | | | | | COLUMN ADDRESS | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 1 |
| 0 | 0 | 0 | 0 | 0 | 0 | 0 | 0 | 1 | 0 |
| 0 | 0 | 0 | 0 | 0 | 0 | 0 | 0 | 1 | 1 |
| 0 | 0 | 0 | 0 | 0 | 0 | 0 | 1 | 0 | 0 |
| 0 | 0 | 0 | 0 | 0 | 0 | 0 | 1 | 0 | 1 |
| 0 | 0 | 0 | 0 | 0 | 0 | 0 | 1 | 1 | 0 |
| 0 | 0 | 0 | 0 | 0 | 0 | 0 | 1 | 1 | 1 |
| 0 | 0 | 0 | 0 | 0 | 0 | 1 | 0 | 0 | 0 |
| 0 | 0 | 0 | 0 | 0 | 0 | 1 | 0 | 0 | 1 |
| 0 | 0 | 0 | 0 | 0 | 0 | 1 | 0 | 1 | 0 |
| 0 | 0 | 0 | 0 | 0 | 0 | 1 | 0 | 1 | 1 |
| 0 | 0 | 0 | 0 | 0 | 0 | 1 | 1 | 0 | 0 |
| 0 | 0 | 0 | 0 | 0 | 0 | 1 | 1 | 0 | 1 |
| 0 | 0 | 0 | 0 | 0 | 0 | 1 | 1 | 1 | 0 |
| 0 | 0 | 0 | 0 | 0 | 0 | 1 | 1 | 1 | 1 |
| 0 | 0 | 0 | 0 | 0 | 1 | 0 | 0 | 0 | 0 |
| 0 | 0 | 0 | 0 | 0 | 1 | 0 | 0 | 0 | 1 |
| 0 | 0 | 0 | 0 | 0 | 1 | 0 | 0 | 1 | 0 |
| 0 | 0 | 0 | 0 | 0 | 1 | 0 | 0 | 1 | 1 |
| 0 | 0 | 0 | 0 | 0 | 1 | 0 | 1 | 0 | 0 |
| 0 | 0 | 0 | 0 | 0 | 1 | 0 | 1 | 0 | 1 |
| 0 | 0 | 0 | 0 | 0 | 1 | 0 | 1 | 1 | 0 |
| 0 | 0 | 0 | 0 | 0 | 1 | 0 | 1 | 1 | 1 |
| 0 | 0 | 0 | 0 | 0 | 1 | 1 | 0 | 0 | 0 |
| 0 | 0 | 0 | 0 | 0 | 1 | 1 | 0 | 0 | 1 |
| 0 | 0 | 0 | 0 | 0 | 1 | 1 | 0 | 1 | 0 |
| 0 | 0 | 0 | 0 | 0 | 1 | 1 | 0 | 1 | 1 |
| 0 | 0 | 0 | 0 | 0 | 1 | 1 | 1 | 0 | 0 |
| 0 | 0 | 0 | 0 | 0 | 1 | 1 | 1 | 0 | 1 |
| 0 | 0 | 0 | 0 | 0 | 1 | 1 | 1 | 1 | 0 |
| 0 | 0 | 0 | 0 | 0 | 1 | 1 | 1 | 1 | 1 |

| ADDRESS PRODUCT | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

The row column multiplication table for PROM 34 is given by Table IV.

TABLE IV

| i(j) Input BIT Pattern | | | | |
|---|---|---|---|---|
| Most Significant BIT | | | | Least Significant BIT |
| 0 | 0 | 0 | 0 | 0 |
| 0 | 0 | 0 | 0 | 1 |
| 0 | 0 | 0 | 1 | 0 |
| 0 | 0 | 0 | 1 | 1 |
| 0 | 0 | 1 | 0 | 0 |
| 0 | 0 | 1 | 0 | 1 |
| 0 | 0 | 1 | 1 | 0 |
| 0 | 0 | 1 | 1 | 1 |
| 0 | 1 | 0 | 0 | 0 |
| 0 | 1 | 0 | 0 | 1 |
| 0 | 1 | 0 | 1 | 0 |
| 0 | 1 | 0 | 1 | 1 |
| 0 | 1 | 1 | 0 | 0 |
| 0 | 1 | 1 | 0 | 1 |
| 0 | 1 | 1 | 1 | 0 |
| 0 | 1 | 1 | 1 | 1 |
| 1 | 0 | 0 | 0 | 0 |
| 1 | 0 | 0 | 0 | 1 |
| 1 | 0 | 0 | 1 | 0 |
| 1 | 0 | 0 | 1 | 1 |
| 1 | 0 | 1 | 0 | 0 |
| 1 | 0 | 1 | 0 | 1 |
| 1 | 0 | 1 | 1 | 0 |
| 1 | 0 | 1 | 1 | 1 |
| 1 | 1 | 0 | 0 | 0 |
| 1 | 1 | 0 | 0 | 1 |
| 1 | 1 | 0 | 1 | 0 |
| 1 | 1 | 0 | 1 | 1 |
| 1 | 1 | 1 | 0 | 0 |
| 1 | 1 | 1 | 0 | 1 |
| 1 | 1 | 1 | 1 | 0 |
| 1 | 1 | 1 | 1 | 1 |

| $i^2$ ($j^2$) Input BIT Pattern | | | | | | | | |
|---|---|---|---|---|---|---|---|---|
| Most Significant | | | | | | | | Least Significant BIT |
| 0 | 0 | 0 | 0 | 0 | 0 | 0 | 0 | 0 |
| 0 | 0 | 0 | 0 | 0 | 0 | 0 | 0 | 1 |
| 0 | 0 | 0 | 0 | 0 | 0 | 1 | 0 | 0 |
| 0 | 0 | 0 | 0 | 0 | 1 | 0 | 0 | 1 |
| 0 | 0 | 0 | 0 | 1 | 0 | 0 | 0 | 0 |
| 0 | 0 | 0 | 0 | 1 | 1 | 0 | 0 | 1 |
| 0 | 0 | 0 | 1 | 0 | 0 | 1 | 0 | 0 |
| 0 | 0 | 0 | 1 | 1 | 0 | 0 | 0 | 1 |
| 0 | 0 | 1 | 0 | 0 | 0 | 0 | 0 | 0 |
| 0 | 0 | 1 | 0 | 1 | 0 | 0 | 0 | 1 |
| 0 | 0 | 1 | 1 | 0 | 0 | 1 | 0 | 0 |
| 0 | 0 | 1 | 1 | 1 | 1 | 0 | 0 | 1 |
| 0 | 1 | 0 | 0 | 1 | 0 | 0 | 0 | 0 |
| 0 | 1 | 0 | 1 | 0 | 1 | 0 | 0 | 1 |
| 0 | 1 | 1 | 0 | 0 | 1 | 0 | 0 | 0 |
| 0 | 1 | 1 | 1 | 0 | 0 | 0 | 0 | 1 |
| 1 | 0 | 0 | 0 | 0 | 0 | 0 | 0 | 0 |
| 1 | 0 | 0 | 1 | 0 | 0 | 0 | 0 | 1 |
| 1 | 0 | 1 | 0 | 0 | 0 | 1 | 0 | 0 |
| 1 | 0 | 1 | 1 | 0 | 1 | 0 | 0 | 1 |
| 1 | 1 | 0 | 0 | 1 | 0 | 0 | 0 | 0 |
| 1 | 1 | 0 | 1 | 1 | 1 | 0 | 0 | 1 |
| 1 | 1 | 1 | 0 | 0 | 1 | 0 | 0 | 1 |
| 1 | 0 | 0 | 0 | 1 | 0 | 0 | 0 | 1 |
| 1 | 0 | 0 | 1 | 0 | 0 | 0 | 0 | 0 |
| 1 | 0 | 1 | 1 | 1 | 0 | 0 | 0 | 1 |
| 1 | 0 | 1 | 0 | 0 | 1 | 0 | 0 | 0 |
| 1 | 0 | 1 | 0 | 1 | 1 | 0 | 0 | 1 |
| 1 | 1 | 0 | 0 | 1 | 0 | 0 | 0 | 0 |
| 1 | 1 | 0 | 1 | 0 | 1 | 0 | 0 | 1 |
| 1 | 1 | 0 | 0 | 0 | 1 | 0 | 0 | 0 |
| 1 | 1 | 1 | 1 | 0 | 0 | 0 | 0 | 1 |

This simple table look-up technique requires a minimal amount of components and provides the squares and products of the addresses simultaneous with the binary pattern value.

Figure 7:
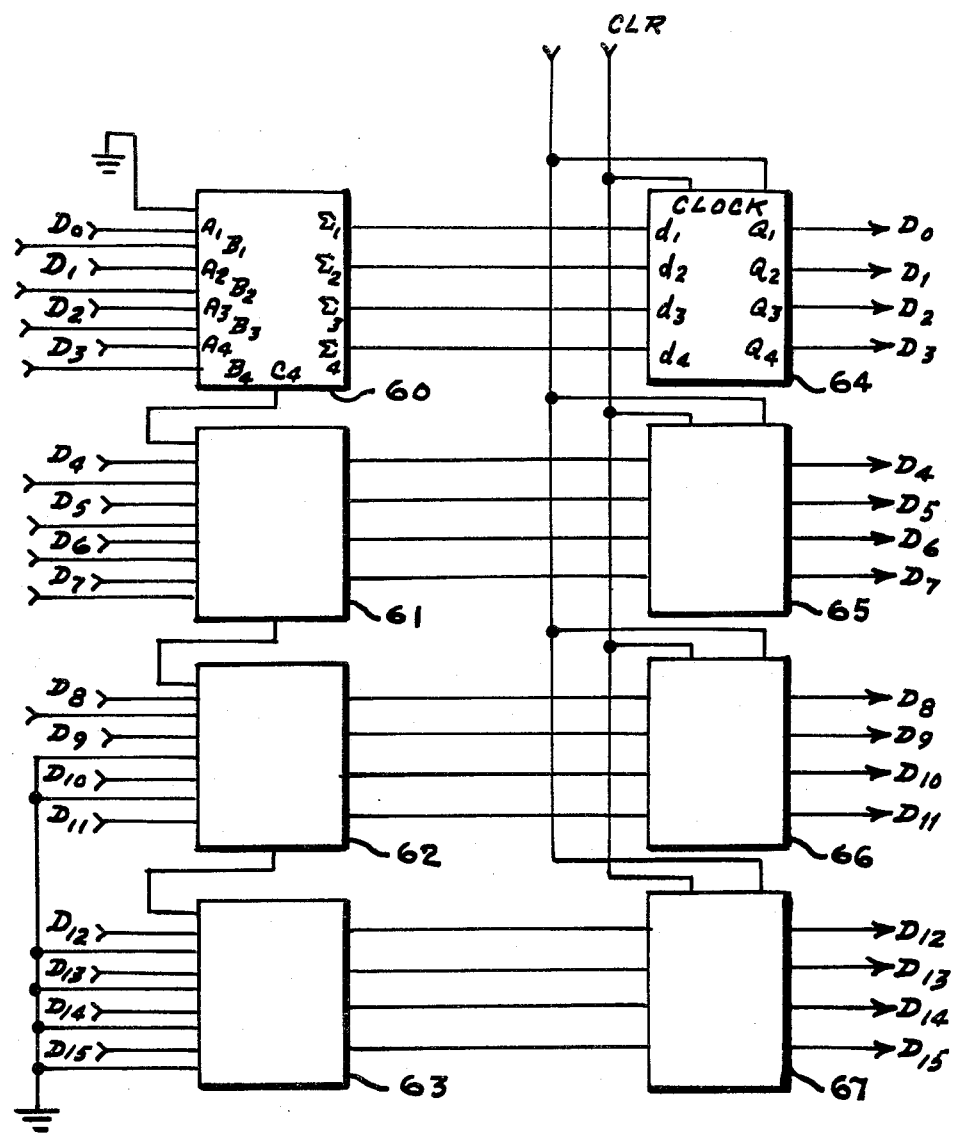
FIG. 7 is a block diagram detailing the moment accumulators of FIG. 6.
Figure 8:
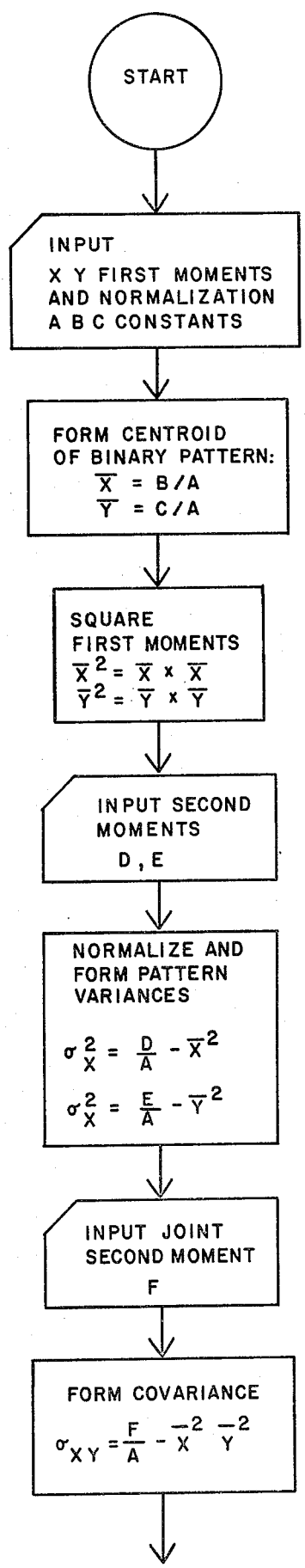
FIGS. 8 through 24 in successive combination comprise a flow chart that defines the programming in accordance with developed equations of the microprocessor of the aimpoint processor of the invention.
Figure 9:
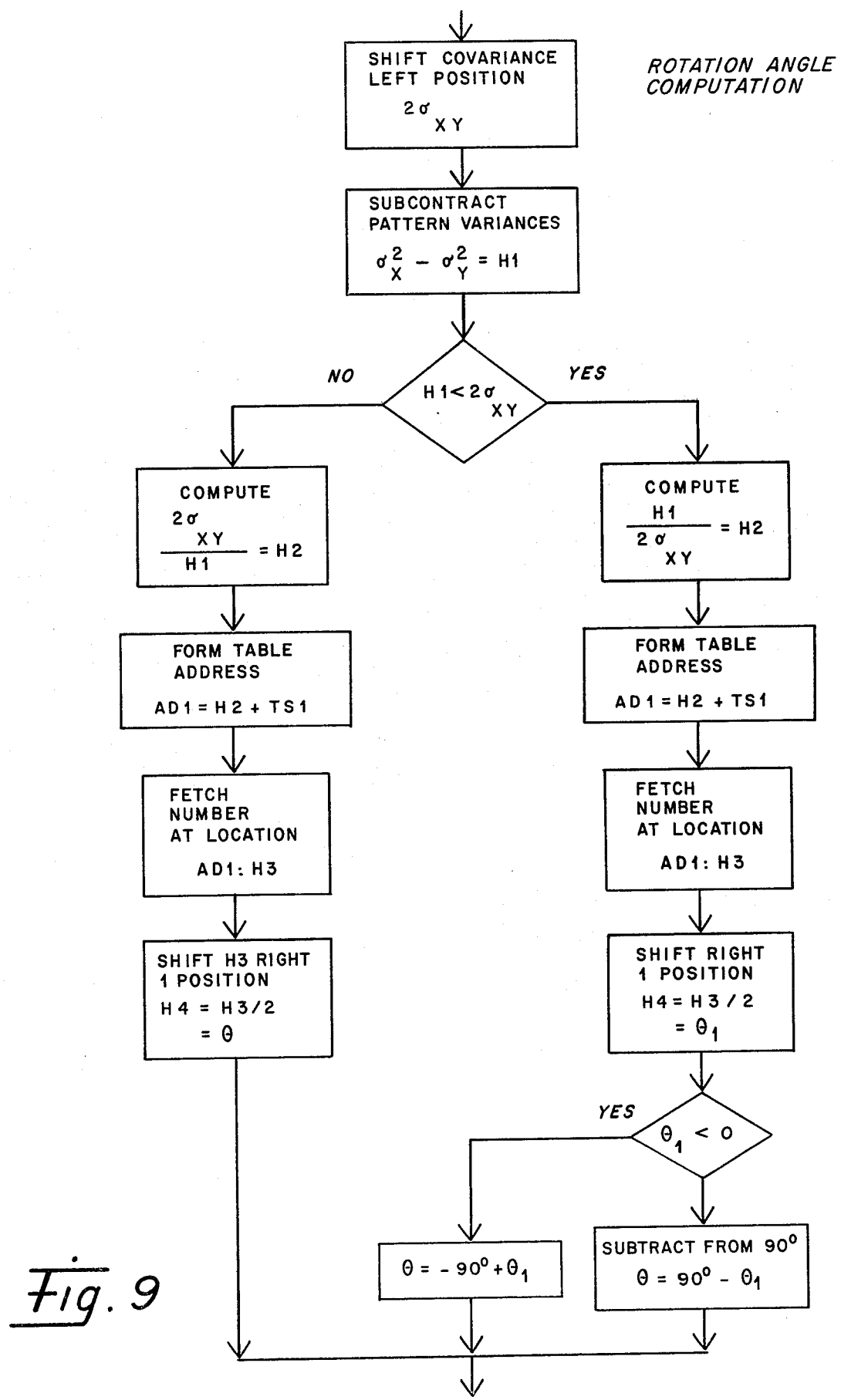
Figure 10:
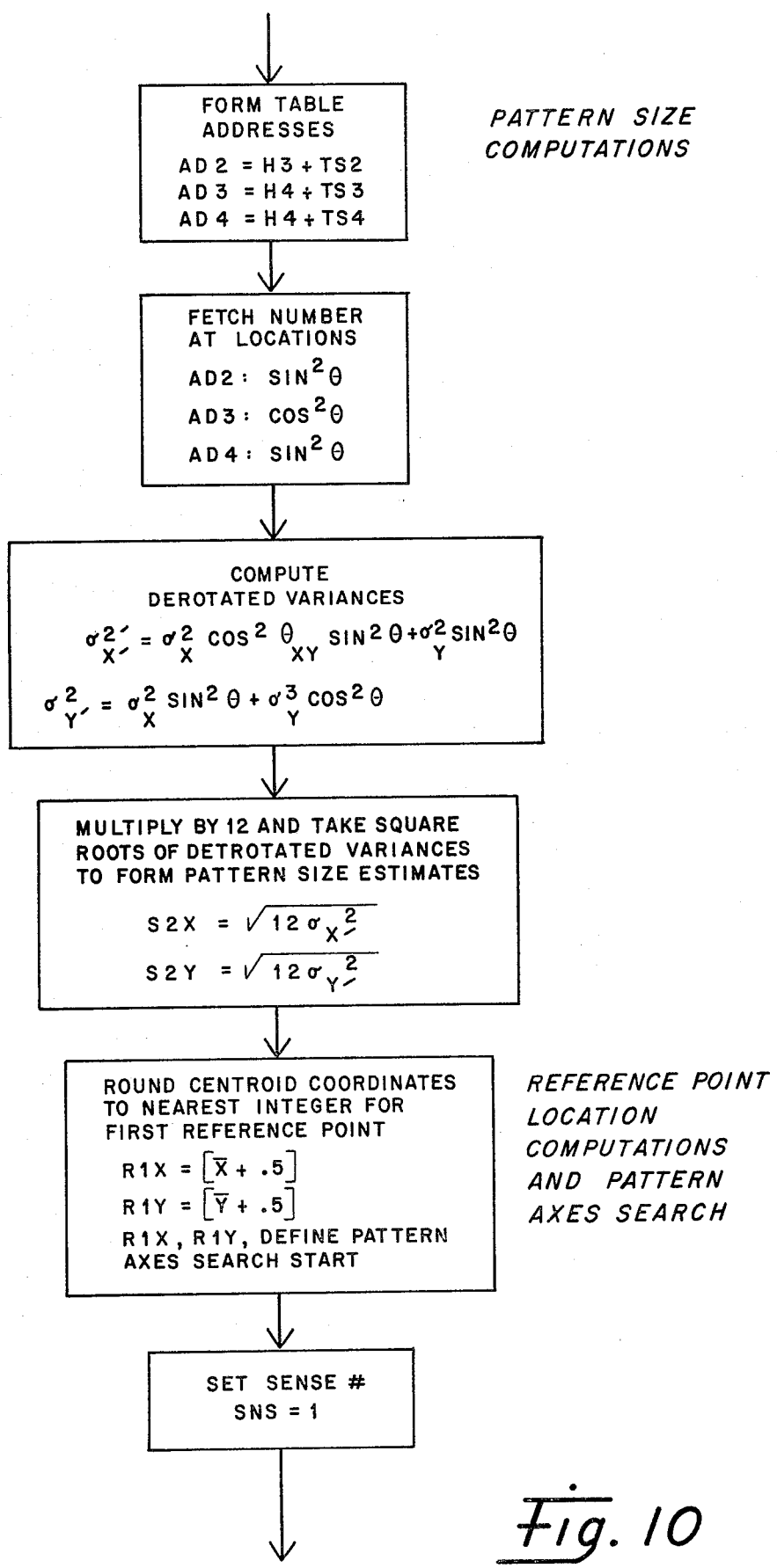
Figure 11:
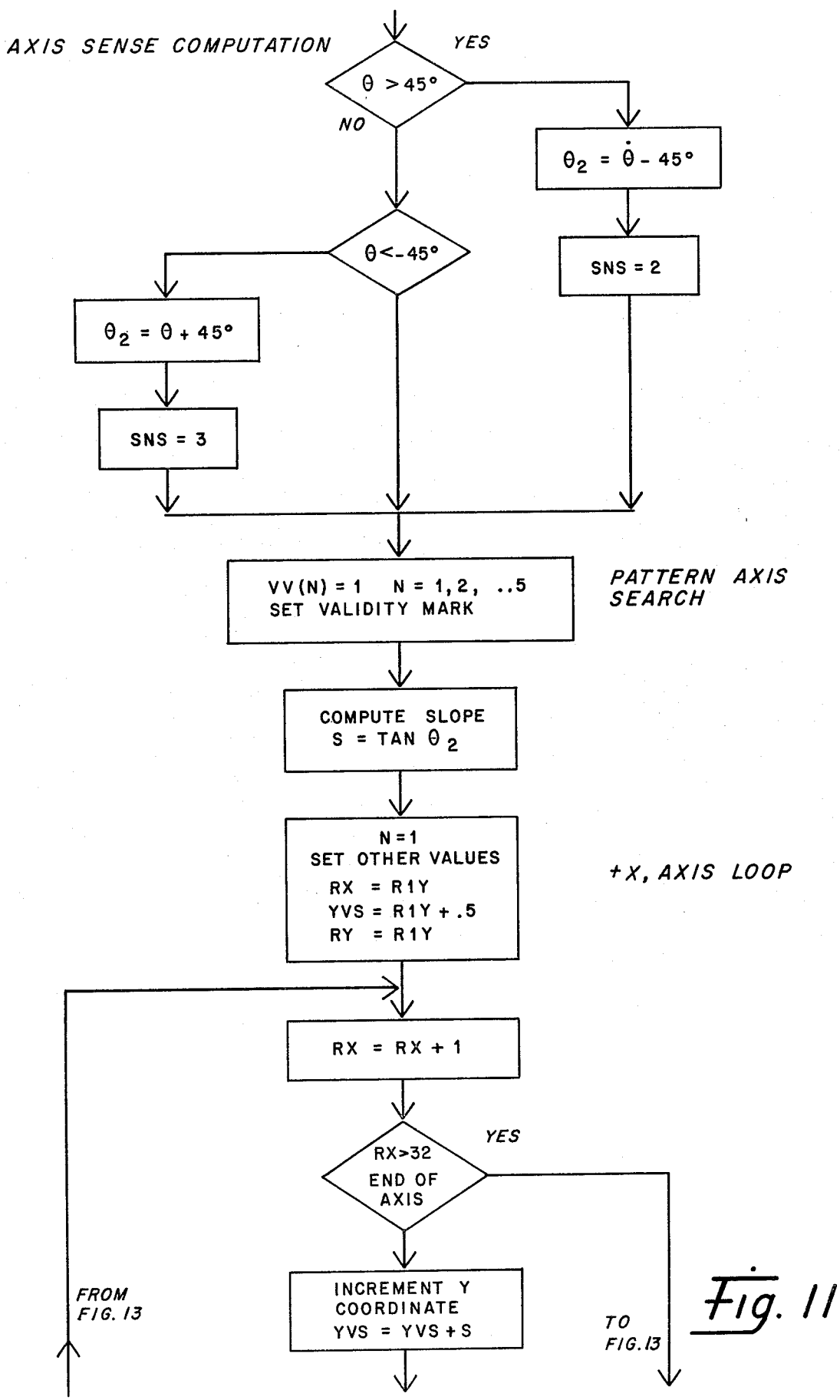
Figure 12:
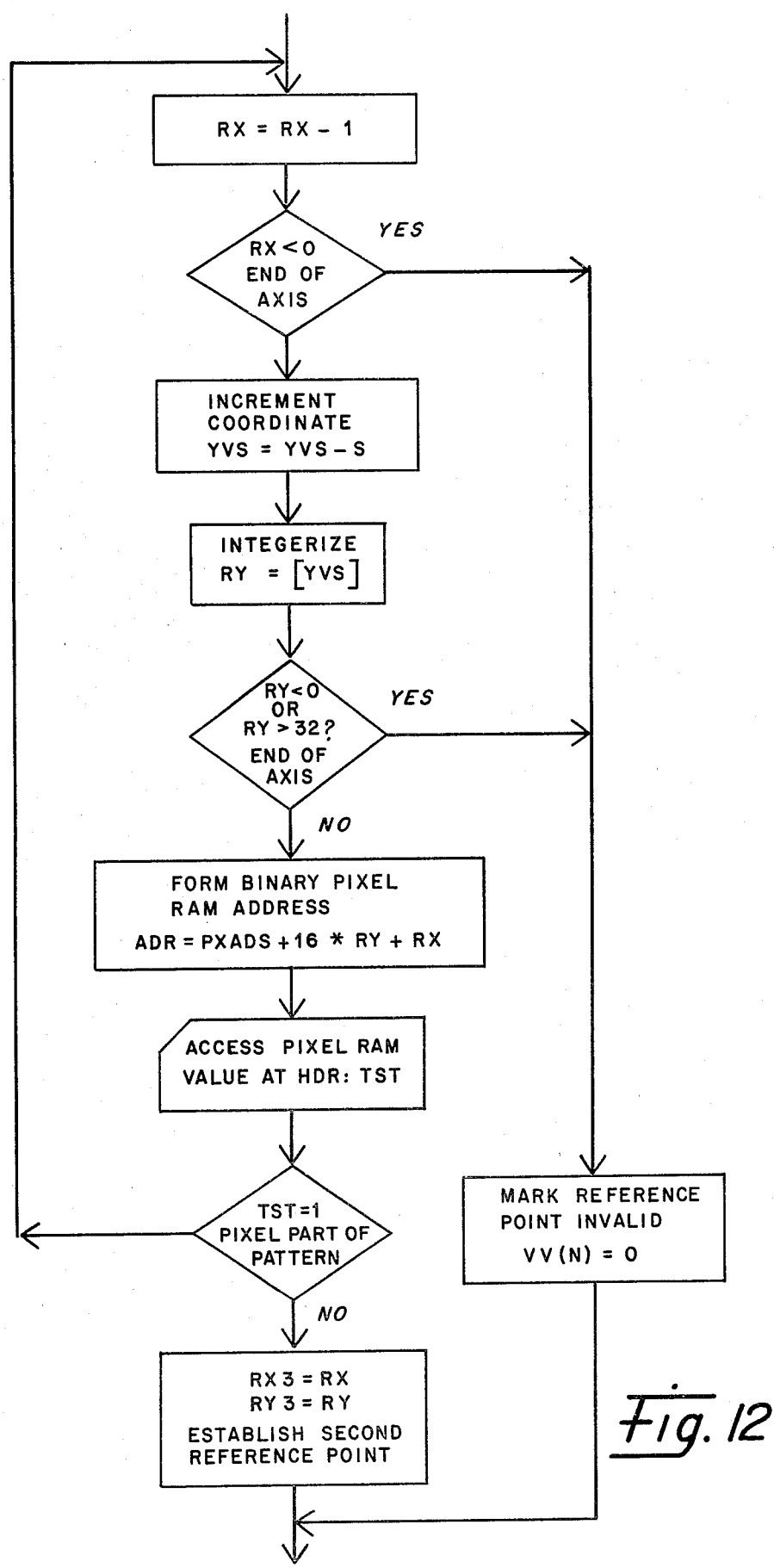
Figure 13:
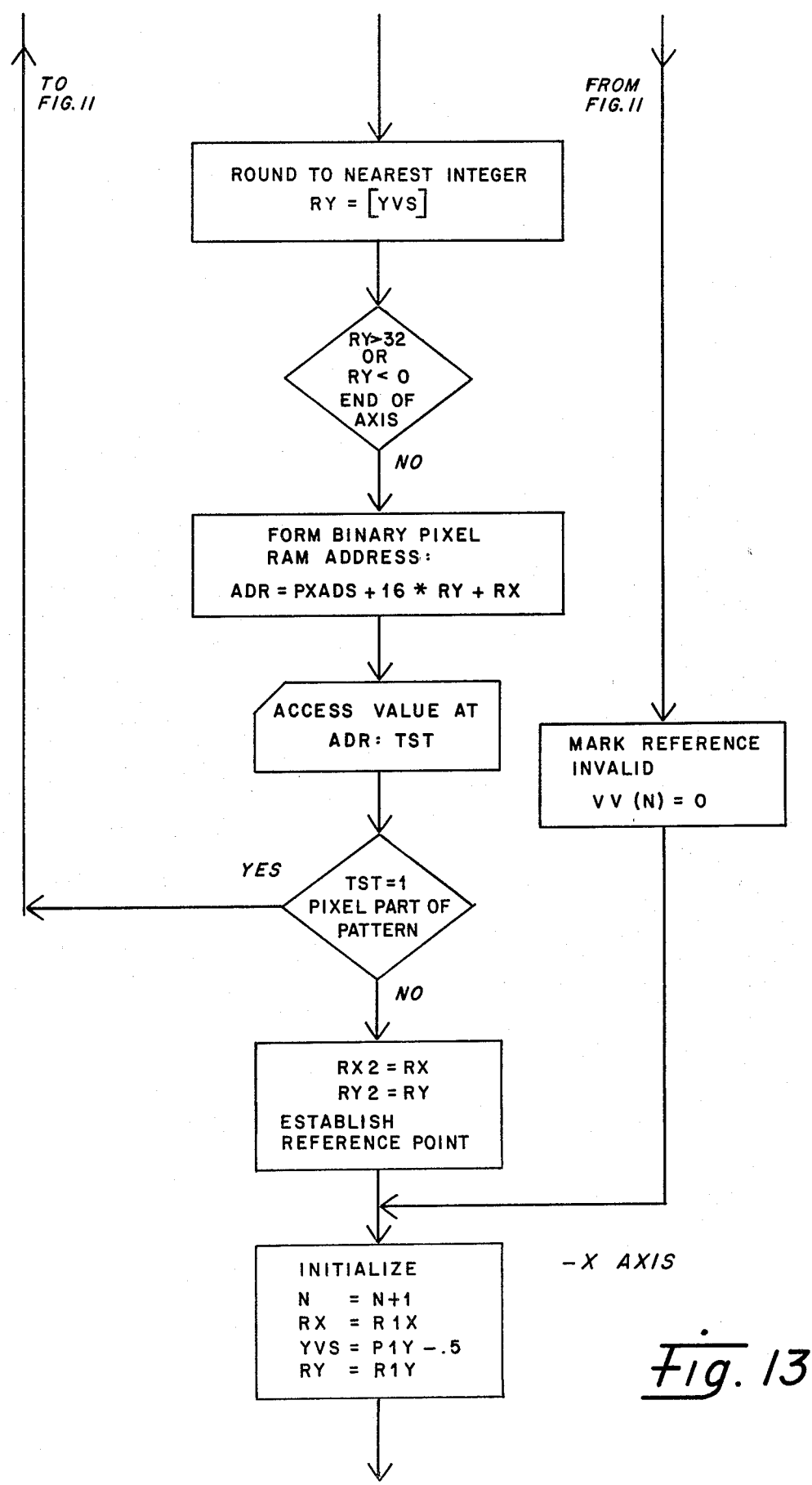
Figure 14:
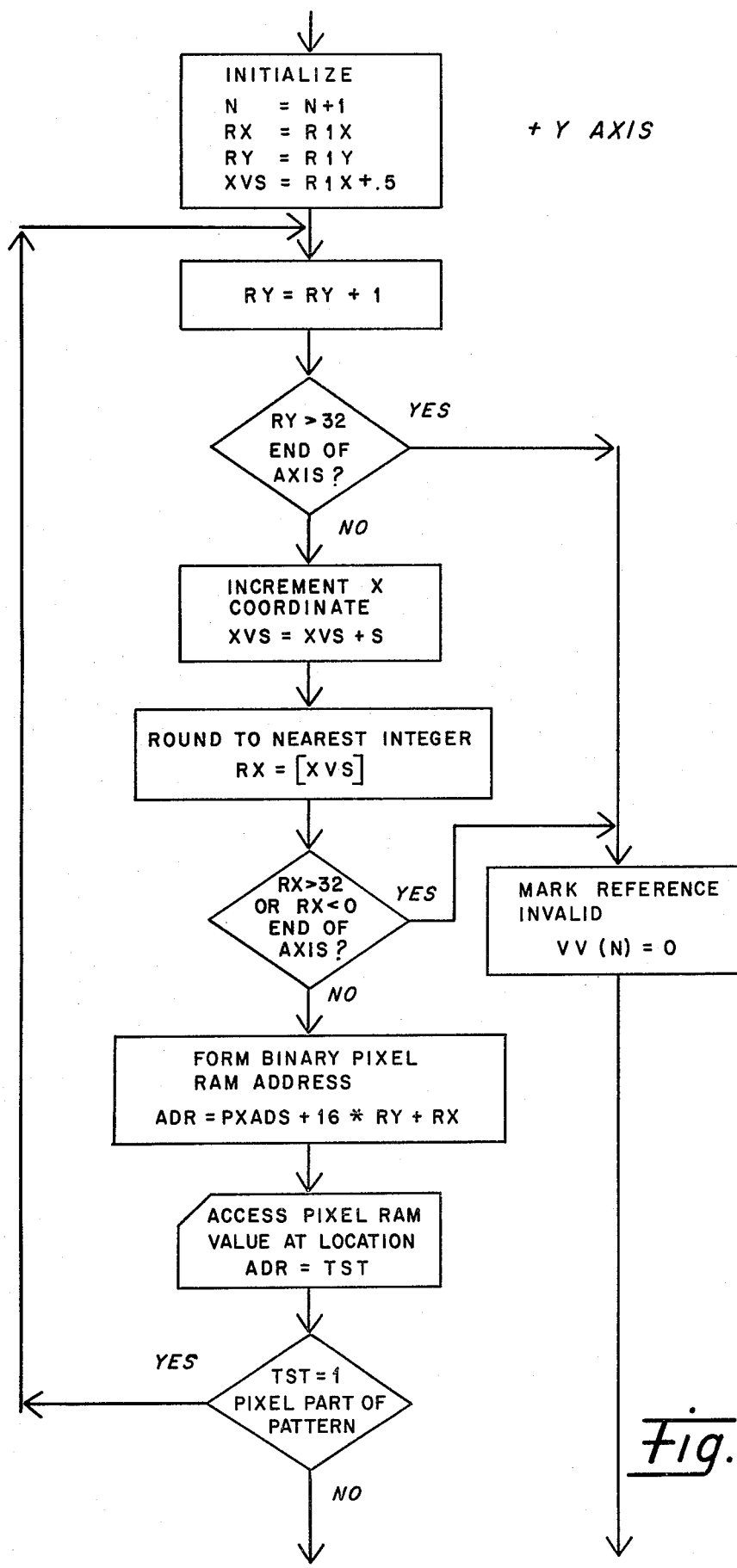
Figure 15:
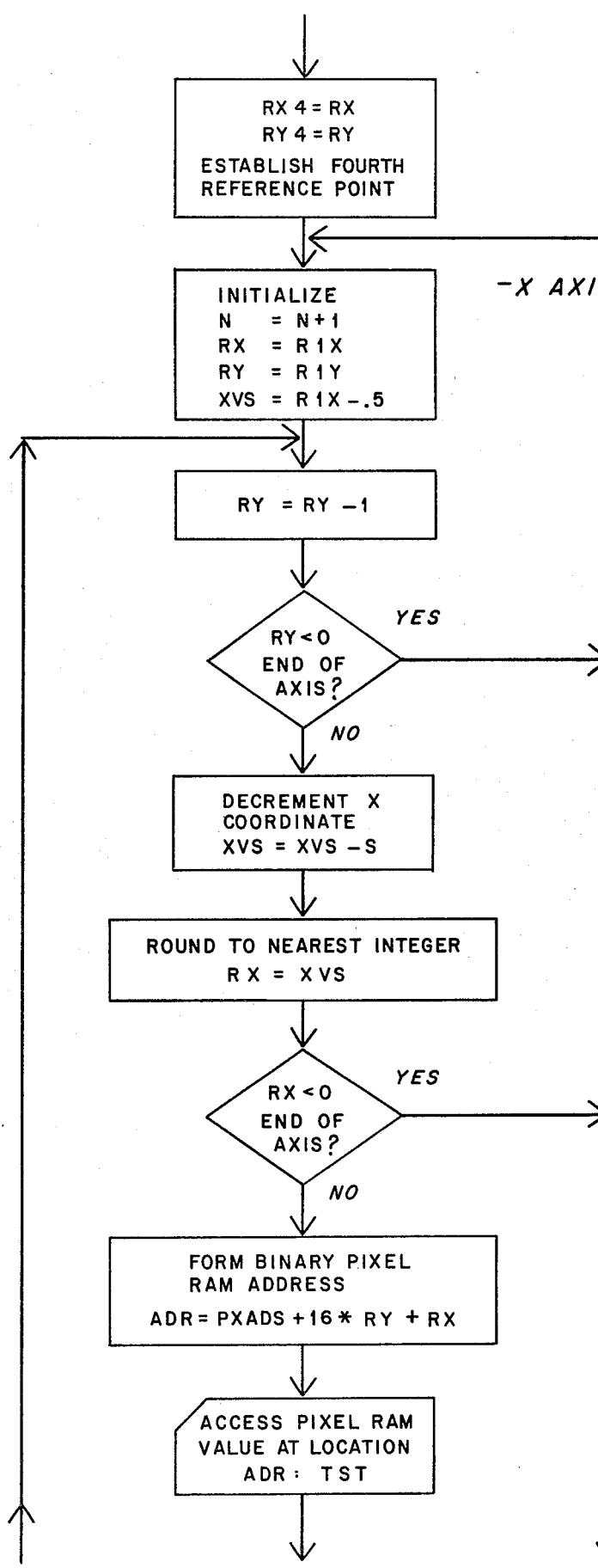
Figure 16:
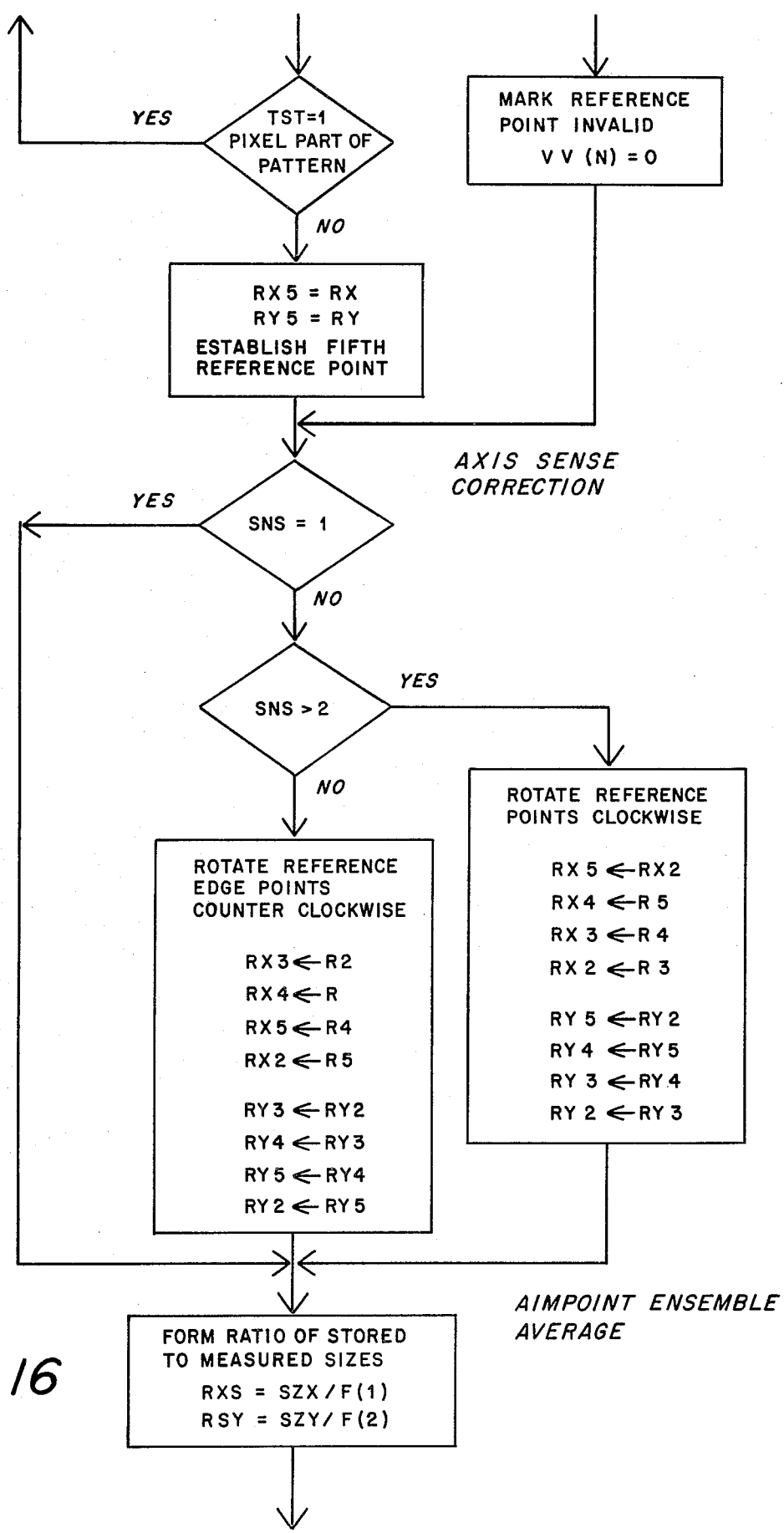
Figure 17:
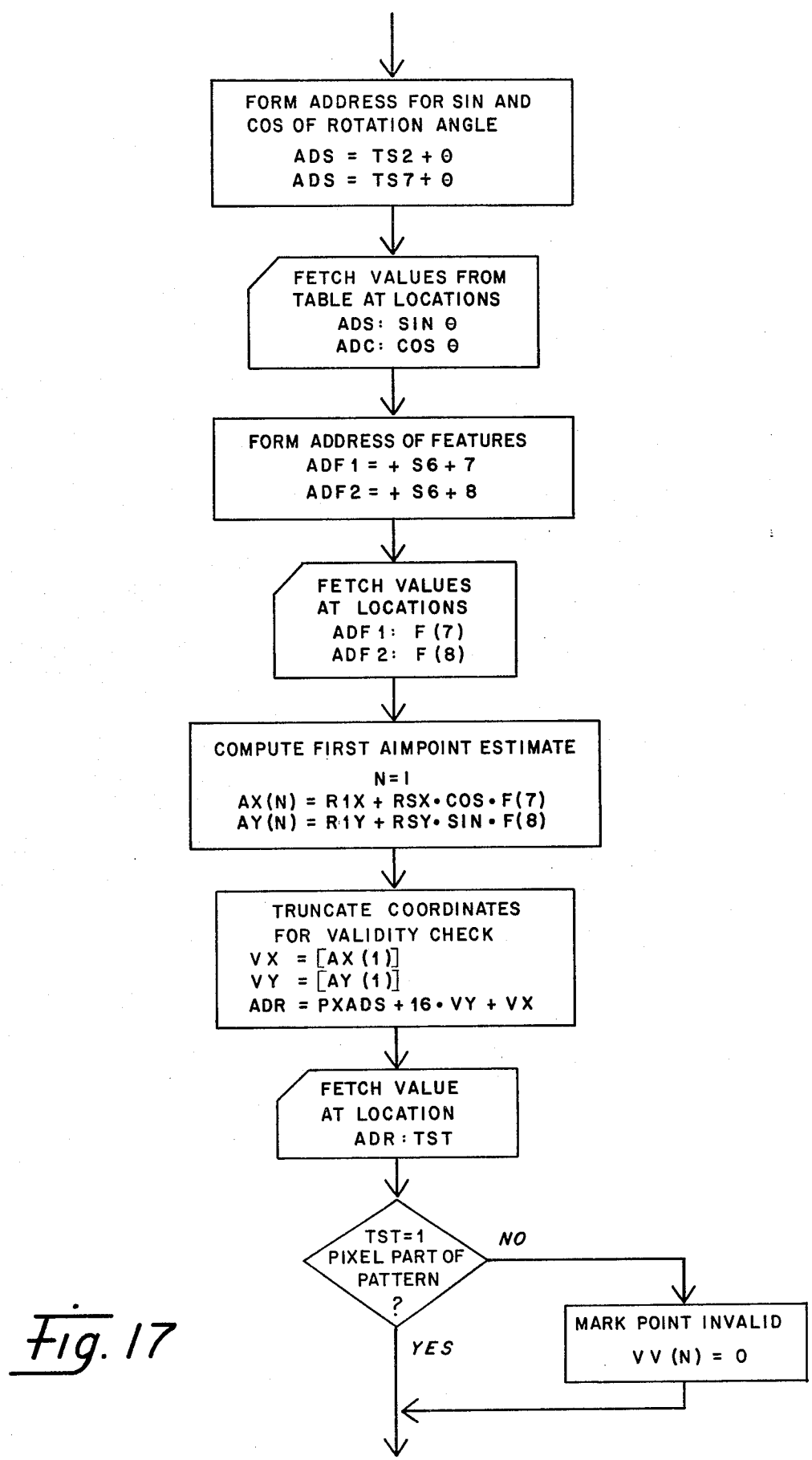
Figure 18:
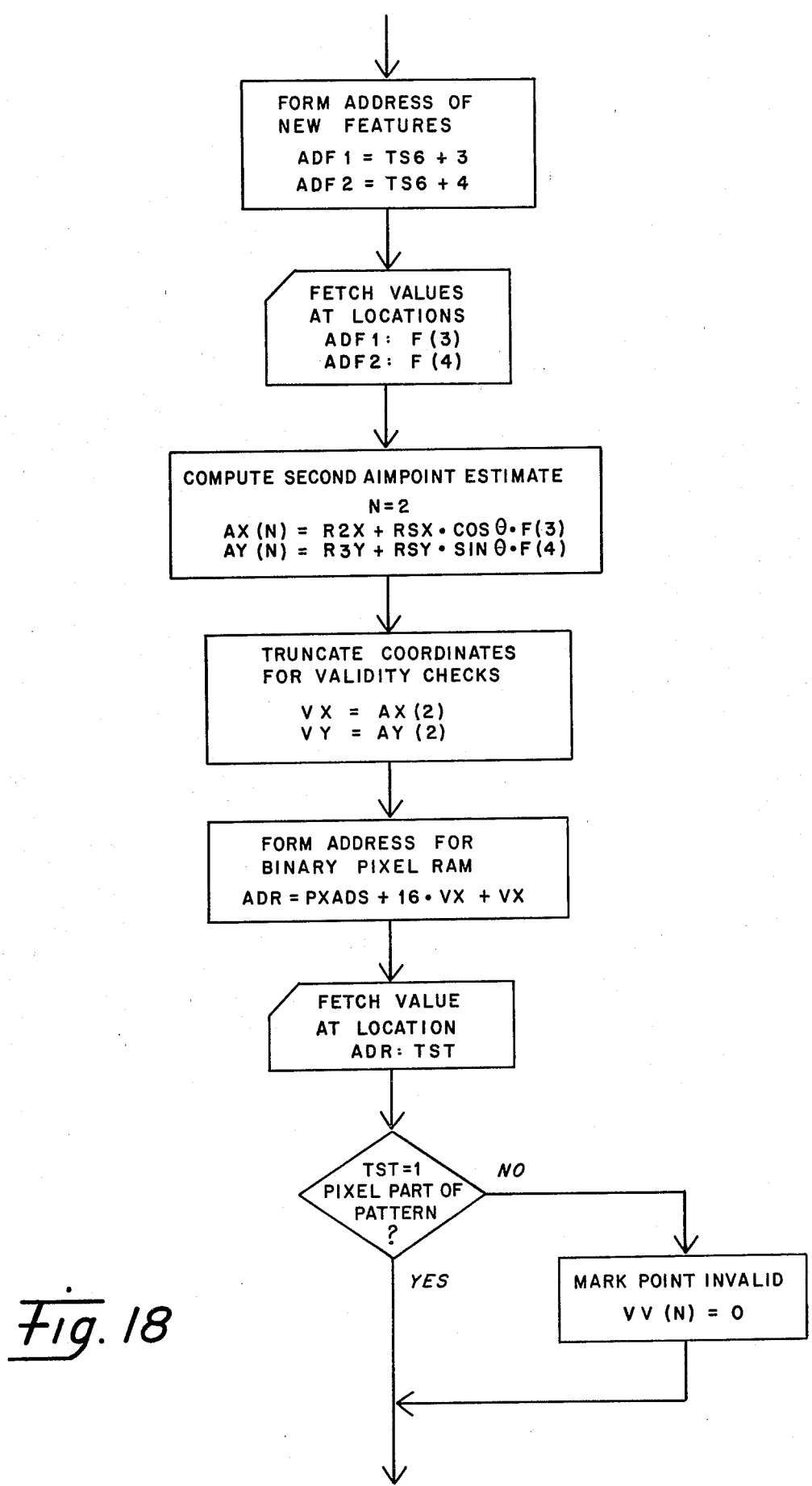
Figure 19:
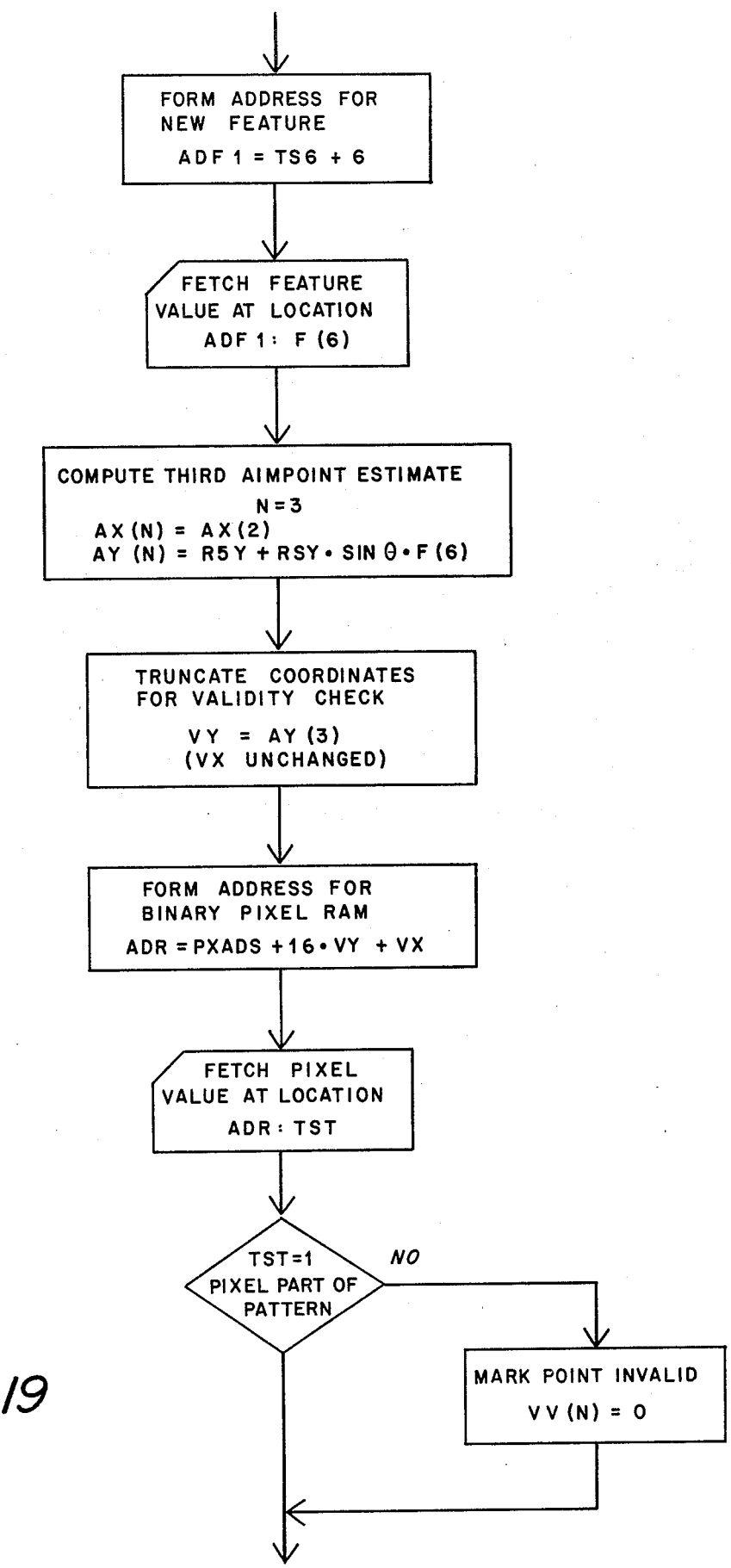
Figure 20:
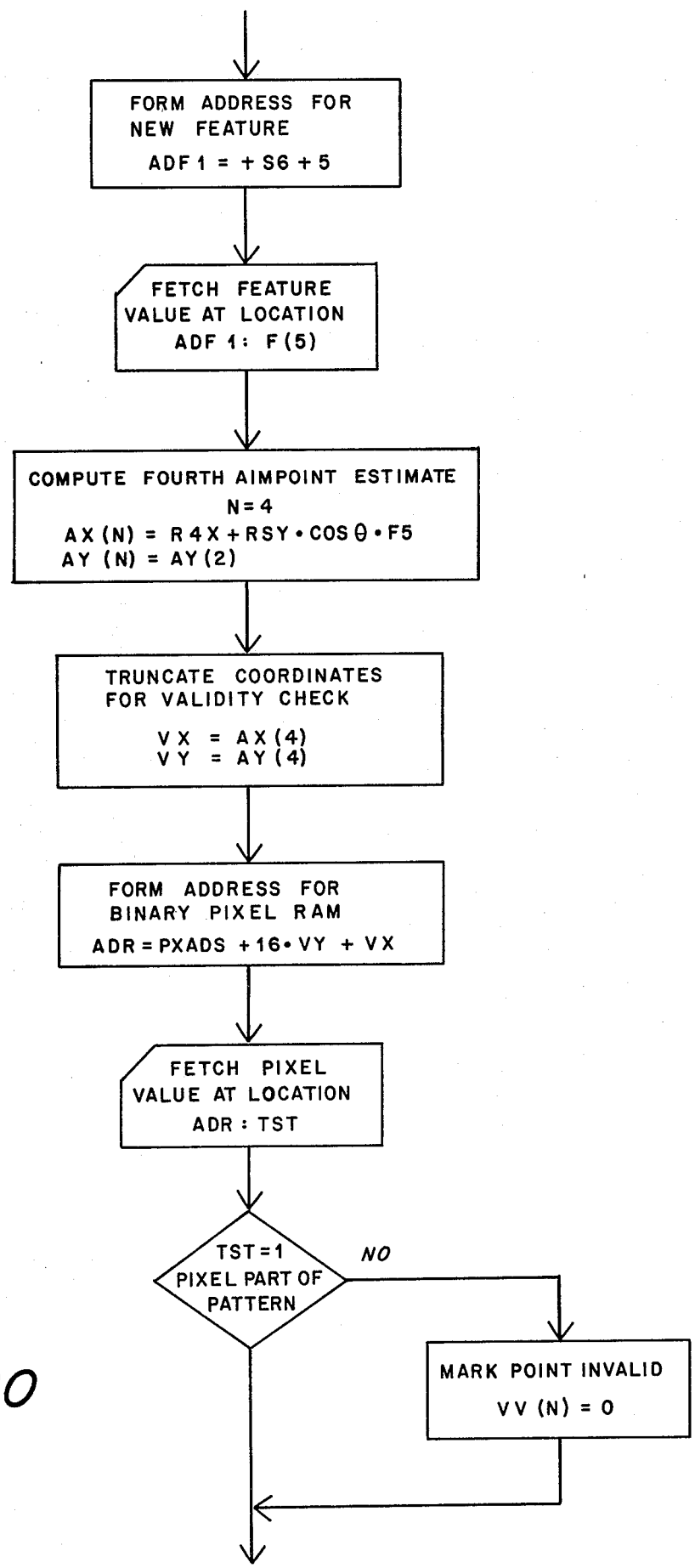
Figure 21:
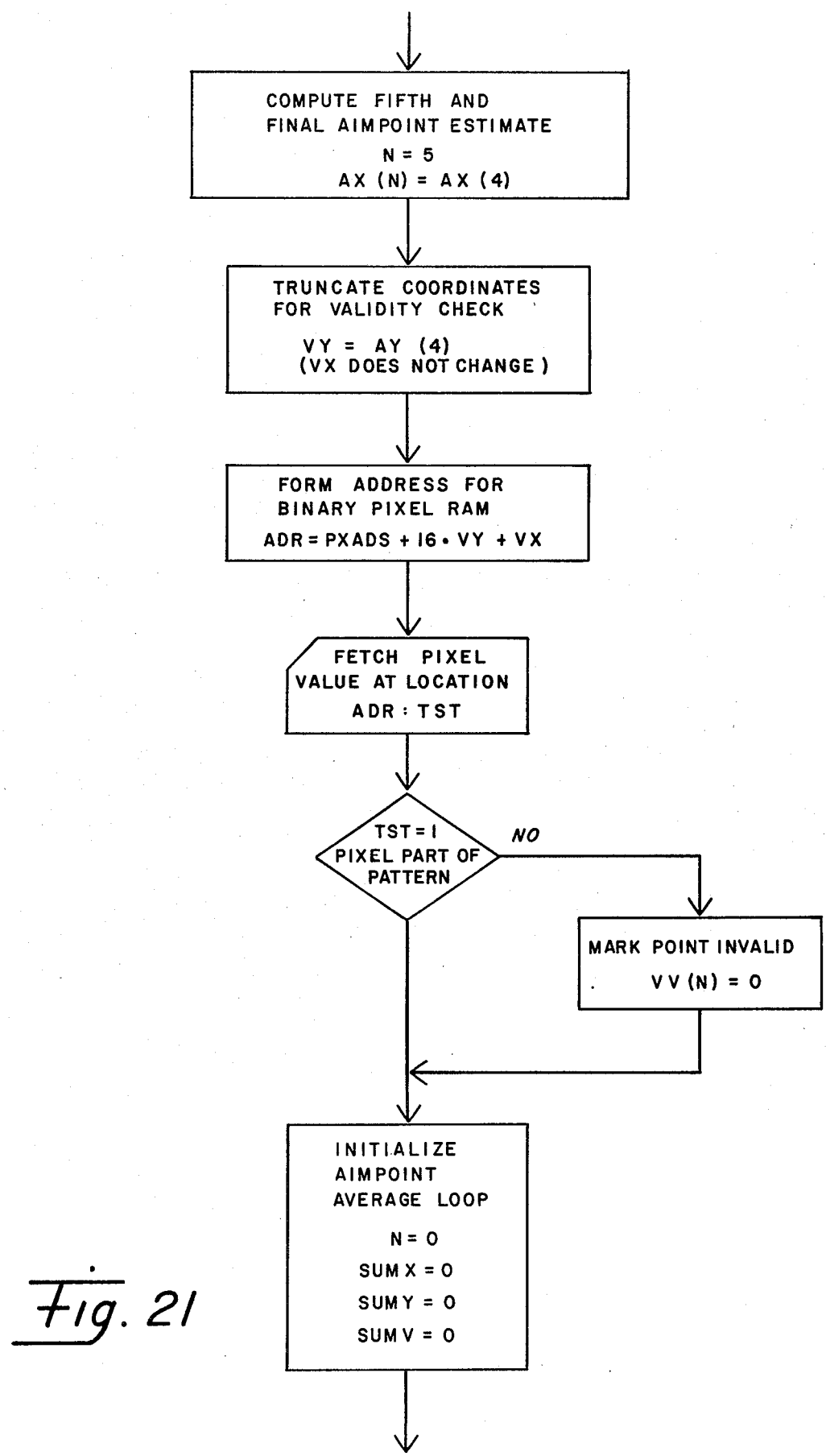
Figure 22:
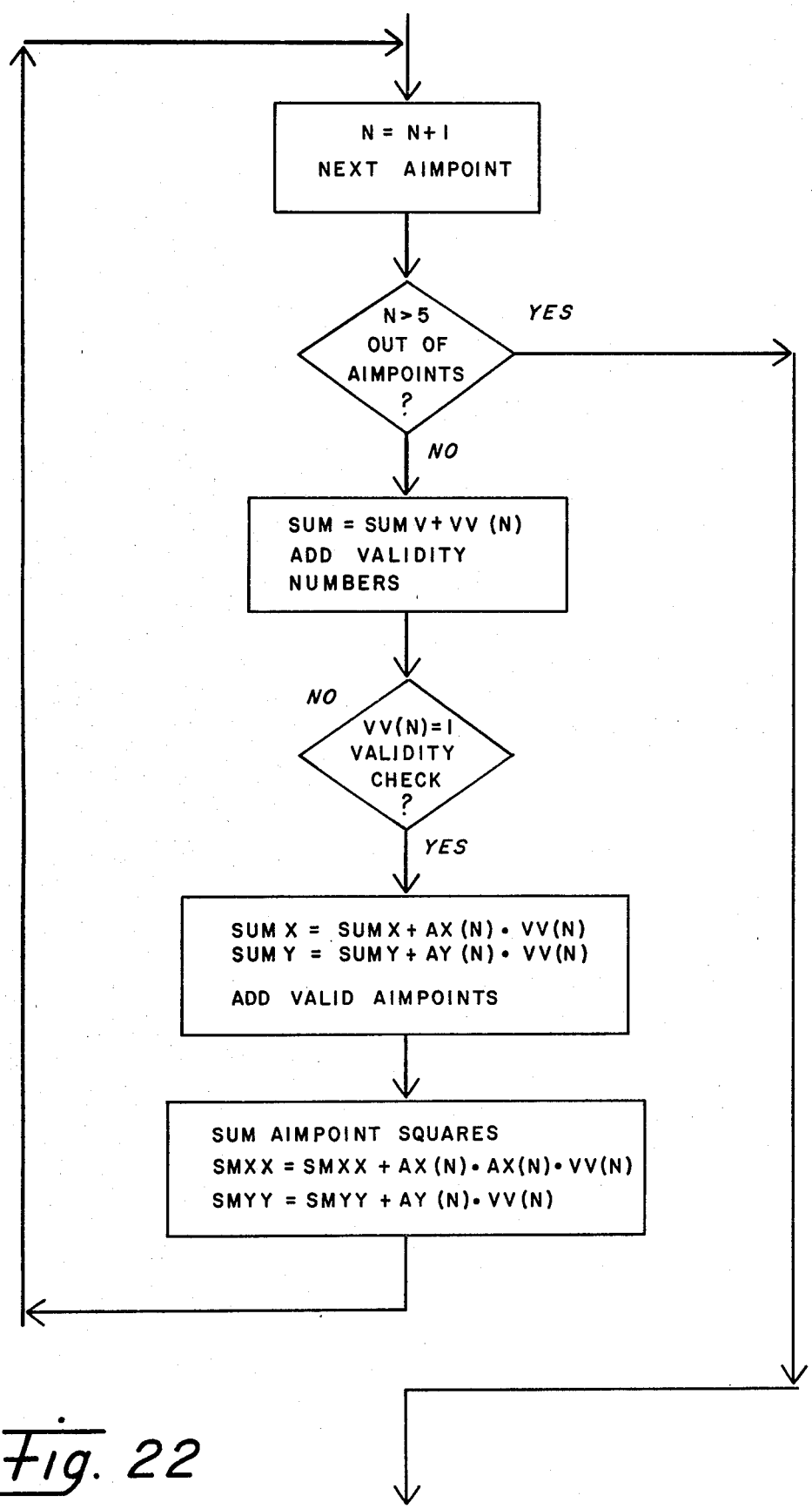
Figure 23:
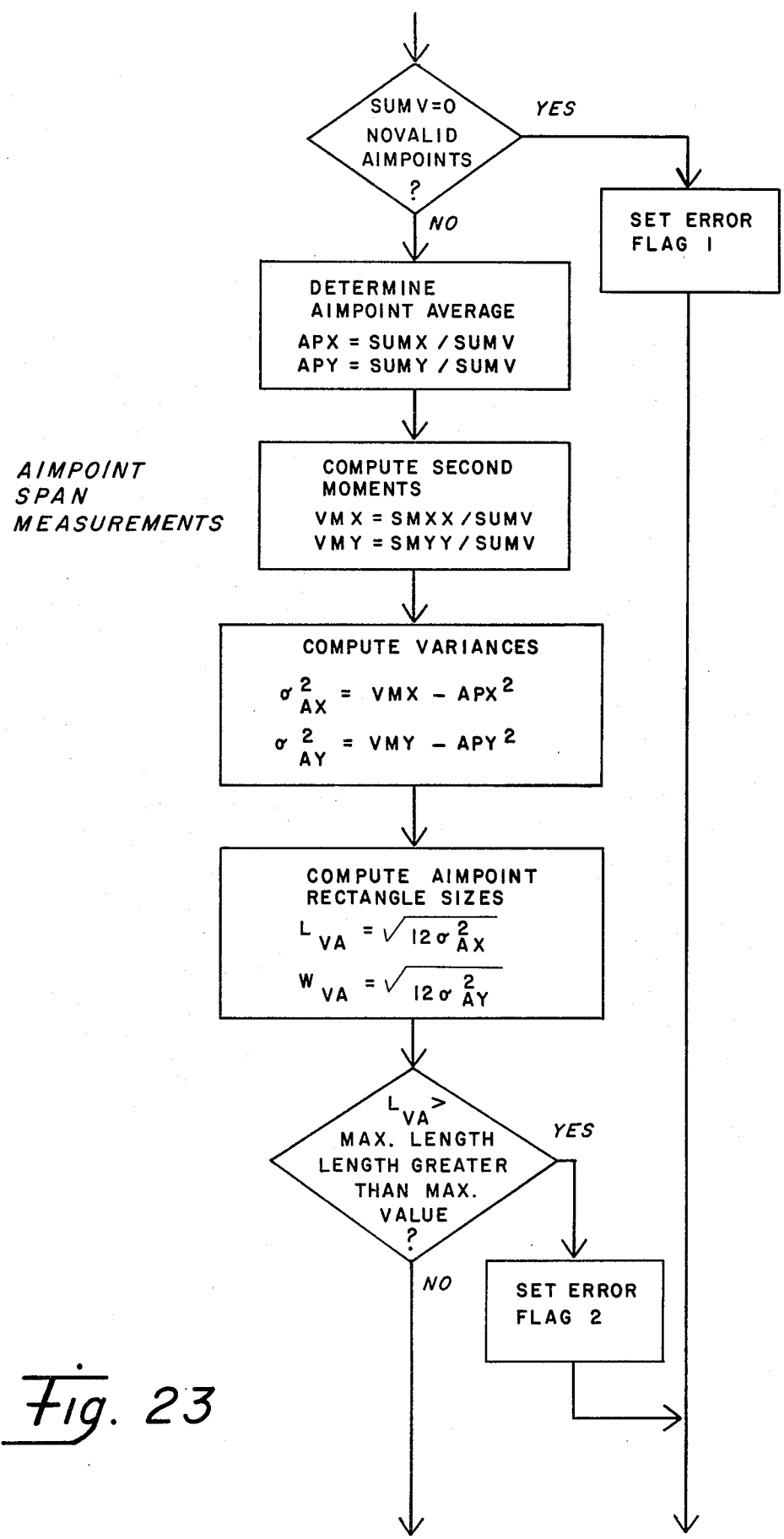
Figure 24:
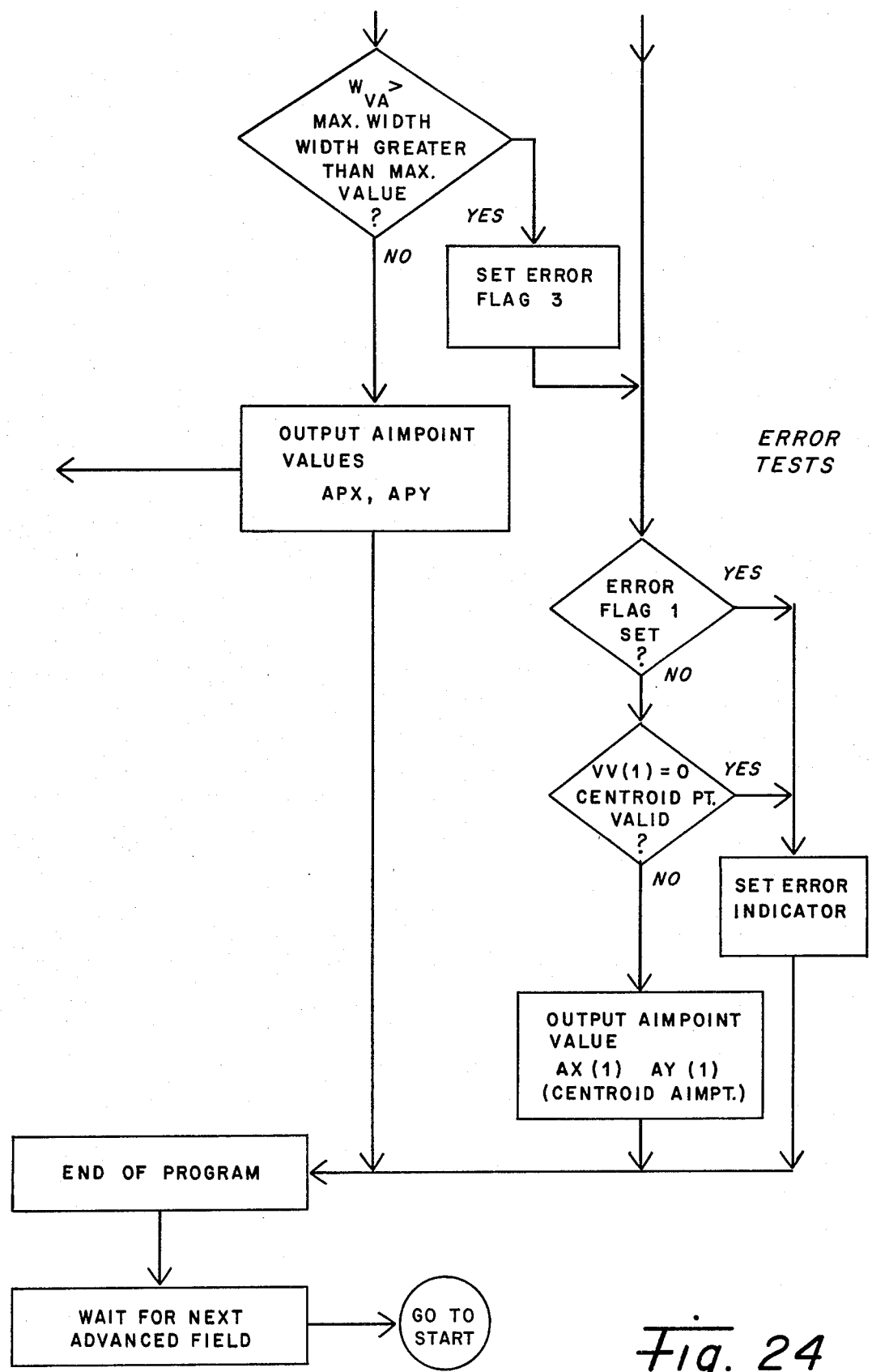

The binary pattern value, the addresses and their squares and product are led to a series of accumulators 35-40. These accumulators compute the first and second moments for each pattern dimension, the first joint pattern moment and the normalization constant U. The accumulator 35 which is used to compute U can be a simple counter since it merely counts the number of "1"s in the binary pattern. The other five, which compute pattern moments, are somewhat more complicated. They consist of a full adder and a latch. The block diagram of FIG. 7 depicts a typical design comprising adders 60-63 and latches 64-67 connected as shown. A 16-bit configuration was chosen in order to allow sufficient data width and to be consistent with the microprocessor bus structure.

The accumulators are designed to be operated in a real time environment, that is, the moment measurements are completed as soon as the last Pixel gray level is clocked from the Pixel Ram 25. At this time, the pattern moment measures are transferred into the microprocessor system's memory through a multiplexer 59 and direct memory access (DMA) interface 58. When this task is completed, the microprocessor's memory contains all the information necessary to complete the aimpoint selection algorithm including the binary pattern, feature vector (pre-computed), and the moment measurements. Computational instructions which implement the algorithm described above are then executed. A composite aimpoint selection results which is then loaded into an output register where it is available for further processing.

A few general comments are in order here on the nature of the algorithem comprehended by the invention. Perhaps the best feature of the algorithm is the ensemble of aimpoint estimates. The same basic data is used to generate five different aimpoint estimates. This ensemble can be processed in a number of different ways to yield a composite aimpoint. Validity tests for the ensemble as well as the final aimpoint can be designed for various types of targets and scenarios, contributing to the flexibility of the algorithm.

The system to execute the algorithm makes maximum use of computations and operations performed in other devices. For example, the discriminant function is derived in the preprocessor. Video digitization and address generation are also required by the digital correlation tracker. Therefore, the specific hardware required is that which is necessary to generate the binary pattern, the moment accumulators and the microprocessor. In principle, performing the moment calculations in dedicated accumulators relieves the microprocessor of many repetitive calculations. By reserving the microprocessor for the more complicated, non-repetitive operations, the entire aimpoint selection algorithm can be executed at video field rates.

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. In a video tracking system having a digital correlation tracker, an imaging sensor, video preprocessor means for spatial and amplitude quantizing of the sensor image into pixels and gray levels and means for computing target discriminant functions therefrom, the improvement residing in an aimpoint selection processor, said aimpoint selection processor comprising
   image binary coding means for developing binary target patterns from said discriminant functions,
   a moment measuring circuit, responsive to said discriminant functions and the output of said image binary coding means, for measuring the moments of said binary target patterns,
   a microprocessor said microprocessor being programmed to: (a) generate and store, from initial binary coding and moment measurement data, a target reference pattern data base defining target pattern size, aspect angle, selected aimpoint and reference points; (b) compute, from real time binary coding and moment measurement data and said reference pattern data base, an ensemble of estimated aimpoints; and (c) average said estimated aimpoints to provide an output aimpoint signal, and
   data bus means operably connected to said image binary coding means, said moment measuring circuit and said microprocessor.

2. In a video tracking system, an aimpoint selection processor as defined in claim 1 wherein said microprocessor further performs the functions of; (a) testing said estimated aimpoints for enclosure in the binary pattern and for clustering properties; and (b) eliminating from the averaged aimpoint output signal estimated aimpoints not within prescribed tests limits.

3. In a video tracking system, an aimpoint selection processor as defined in claim 2 wherein
   said image binary coding means includes a pixel random access holding memory receiving digitized video signals from said digital correlation tracker, an x-y address register responsive to digital correlation tracker and aimpoint processor clocks providing an address for said pixel random access holding memory, an address multiplexer connected to said pixel random access holding memory and receiving discriminant function outputs from said video preprocessor, a discriminant function storage random access memory receiving 1 bit data from said video preprocessor, and a binary pattern random access memory receiving data output from said discriminant function storage random access memory and address from said pixel random access memory, and wherein,
   said moment measuring circuit comprises first, second and third programmable read only memories receiving row and column addresses from said x-y address register and providing binary pattern values, addresses and their squares and products to a series of moment accumulators, said moment accumulators also receiving data from said discriminant function storage random access memory and providing input data to said microprocessor.

4. In a video tracking system, an aimpoint selection processor as defined in claim 3 wherein said data bus means comprises a data and control bus addressed by said binary pattern random access memory and said microprocessor, and wherein said aimpoint selection processor includes a multiplexer receiving the outputs of said moment measuring circuit and feeding said data and control bus through a direct memory access interface means, and an output register receiving output aimpoint signals from said microprocessor.

* * * * *